United States Patent
Fujiwara et al.

(10) Patent No.: US 12,413,156 B2
(45) Date of Patent: Sep. 9, 2025

(54) CAPACITOR BALANCING CONTROL IN AN HVDC MMC

(71) Applicant: Mitsubishi Electric Corporation, Tokyo (JP)

(72) Inventors: Shuhei Fujiwara, Tokyo (JP); Yoshiyuki Kono, Tokyo (JP); Ryosuke Uda, Tokyo (JP); Takuya Kajiyama, Tokyo (JP); Toshiyuki Fujii, Tokyo (JP); Shigeo Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 17/919,917

(22) PCT Filed: Jun. 17, 2020

(86) PCT No.: PCT/JP2020/023806
§ 371 (c)(1),
(2) Date: Oct. 19, 2022

(87) PCT Pub. No.: WO2021/255865
PCT Pub. Date: Dec. 23, 2021

(65) Prior Publication Data
US 2023/0163694 A1    May 25, 2023

(51) Int. Cl.
*H02M 7/483*    (2007.01)

(52) U.S. Cl.
CPC ....... *H02M 7/4835* (2021.05); *H02M 7/4833* (2021.05)

(58) Field of Classification Search
CPC ........................................ H02M 7/4833–4835
See application file for complete search history.

(56) References Cited

U.S. PATENT DOCUMENTS

| | | | |
|---|---|---|---|
| 7,835,166 | B2 | 11/2010 | Hiller |
| 2010/0067266 | A1 | 3/2010 | Dommaschk et al. |

(Continued)

FOREIGN PATENT DOCUMENTS

| | | | |
|---|---|---|---|
| JP | 2011182517 A | | 9/2011 |
| JP | 2019030106 A | | 2/2019 |
| JP | 2019092333 A | * | 6/2019 |

OTHER PUBLICATIONS

Machine translation of Yamada (JP-2019092333-A) (Year: 2019).*

(Continued)

*Primary Examiner* — Peter M Novak
(74) *Attorney, Agent, or Firm* — Buchanan Ingersoll & Rooney PC

(57) ABSTRACT

In an MMC-type power conversion device, a control device calculates an evaluation value representing the degree of variations in voltage of capacitors of individual converter cells. When this evaluation value exceeds a threshold value, the control device controls the converter cells as follows: (i) when current in a positive direction flows through a first converter cell with a voltage of the capacitor greater than a mean value, reducing an output time of positive voltage, (ii) when current in a negative direction flows through the first converter cell, increasing an output time of positive voltage, (iii) when current in the positive direction flows through a second converter cell with a voltage of the capacitor smaller than a mean value, increasing an output time of positive voltage, or (iv) when current in the negative direction flows through the second converter cell, reducing an output time of positive voltage.

11 Claims, 25 Drawing Sheets

(56) References Cited

U.S. PATENT DOCUMENTS

2014/0036557 A1* 2/2014 Nondahl ............... H02M 1/12
363/71
2014/0226374 A1* 8/2014 Hafneer ............. H02M 7/4835
363/35

OTHER PUBLICATIONS

Extended European Search Report dated Jun. 22, 2023, issued in the corresponding European Patent Application No. 20940969.7, 11 pages.
Hagiwara, et al., "Experiment and Simulation of a Modular Push-Pull PWM Converter for a Battery Energy Storage System", IEEE Transactions on Industry Applications, vol. 50, No. 2, Mar. 2014, pp. 1131-1140.
Communication pursuant to Article 94(3) EPC dated Mar. 15, 2024, issued in the corresponding European Patent Application No. 20940969.7, 8 pages.
Korn, et al., "Low Output Frequency Operation of the Modular Multi-level Converter", IEEE Energy Conversion Congress and Exposition, 2010, pp. 3993-3997.
Zhang, et al., "Analysis and Control of MMC-HVDC Under Unbalanced Voltage Conditions", Electric Power Systems Research, vol. 140, Jun. 4, 2016, pp. 528-538.
International Search Report (PCT/ISA/210) with translation and Written Opinion (PCT/ISA/237) mailed on Jul. 21, 2020, by the Japan Patent Office as the International Searching Authority for International Application No. PCT/JP2020/023806. (8 pages).
Summons to Attend Oral Proceedings Pursuant to Rule 115(1) EPC dated Feb. 4, 2025, issued in the corresponding European Patent Application No. 20940969.7, 11 pages.

* cited by examiner (a)

(b)

(c)

CAPACITOR BALANCING CONTROL IN AN HVDC MMC

TECHNICAL FIELD

The present disclosure relates to a power conversion device.

BACKGROUND ART

Modular multilevel converters (MMCs) including a plurality of unit converters (hereinafter referred to as "converter cells") connected in cascade are known as large-capacity power conversion devices installed in power systems. Typically, a converter cell includes a plurality of switching elements and a power storage element (typically, capacitor).

In a modular multilevel converter, the voltage of a power storage element (capacitor voltage) of each individual converter cell need be maintained in the vicinity of a target value in order to obtain a desired control output. If the capacitor voltage falls out of the target value, the output voltage of the converter cell is not as instructed, so that the control characteristics may be deteriorated, for example, due to occurrence of not-intended circulating current. In a serious case, the capacitor voltage excessively rises or excessively lowers to the level of overvoltage protection or undervoltage protection in any converter cell, which may cause the MMC to stop operating.

The capacitor voltage is usually controlled in multi-hierarchy by capacitor voltage control of each individual converter cell (which hereinafter may be referred to as "individual control") as well as by control of converter cells as a whole in the MMC (which hereinafter may be referred to as "all voltage control") and balance control between certain groups (for example, arms or phases) (for example, see Japanese Patent Laying-Open No. 2011-182517 (PTL 1)).

The problem to be solved by Japanese Patent Laying-Open No. 2019-030106 (PTL 2) is unbalance in capacitor voltage caused by failure in stable individual control depending on a situation of an AC circuit when the MMC is connected to the AC circuit such as an AC power source and an AC load. Specifically, in the power conversion device described in this literature, in order to stably perform individual control, circulating current for individual control is fed in addition to circulating current for interphase balance control when AC power flowing in or flowing out between the AC circuit and the power converter is smaller than a threshold value.

CITATION LIST

Patent Literature

PTL 1: Japanese Patent Laying-Open No. 2011-182517
PTL 2: Japanese Patent Laying-Open No. 2019-030106

SUMMARY OF INVENTION

Technical Problem

Unbalance does not always occur between individual capacitor voltages when AC power input/output between the AC circuit and the power converter is smaller than a threshold value. The problem of the control method described in Japanese Patent Laying-Open No. 2019-030106 (PTL 2) above lies in that circulating current for individual control is always fed when AC power input/output between the AC circuit and the power converter is small. Because of this, unnecessary power may be consumed although variations of individual capacitor voltages fall within a permissible range.

The present disclosure is made in view of the problem described above and an object of the present disclosure is to provide an MMC-type power conversion device that can perform individual control of capacitor voltages stably and efficiently.

Solution to Problem

A power conversion device according to an embodiment includes a power converter including at least one arm having a plurality of converter cells connected to each other in cascade, and a control device. Each of the converter cells includes a first input/output terminal on a high potential side, a second input/output terminal on a low potential side, a plurality of switching elements, a power storage element electrically connected to the first input/output terminal and the second input/output terminal through the switching elements, and a voltage detector to detect a voltage of the power storage element. The control device performs phase shift pulse width control for the converter cells included in the at least one arm. The control device calculates an evaluation value representing a degree of variations in voltage of the power storage elements in the converter cells included in the at least one arm. When this evaluation value exceeds a threshold value, the control device controls the converter cells such that at least one of the following is implemented: (i) when current in a first direction that is a direction from the first input/output terminal to the second input/output terminal flows through at least one first converter cell with a voltage of the power storage element greater than a mean value, reducing an output time of a positive voltage in which a positive electrode terminal of the power storage element is connected to the first input/output terminal and a negative electrode terminal of the power storage element is connected to the second input/output terminal, (ii) when current in a second direction opposite to the first direction flows through the first converter cell, increasing an output time of the positive voltage, (iii) when current in the first direction flows through at least one second converter cell with a voltage of the power storage element smaller than a mean value, increasing an output time of the positive voltage, or (iv) when current in the second direction flows through the second converter cell, reducing an output time of the positive voltage.

Advantageous Effects of Invention

According to the embodiment above, when the evaluation value representing variations in voltage of the power storage elements exceeds a threshold value, the converter cells are controlled such that at least one of the above (i) to (iv) is implemented, thereby performing individual control of voltages of the power storage elements stably and efficiently.

DESCRIPTION OF EMBODIMENTS

Embodiments will be described in detail below with reference to the drawings. The same or corresponding parts are denoted by the same reference signs and a description thereof may be not repeated.

First Embodiment (Overall Configuration of Power Conversion Device)

Figure 1:
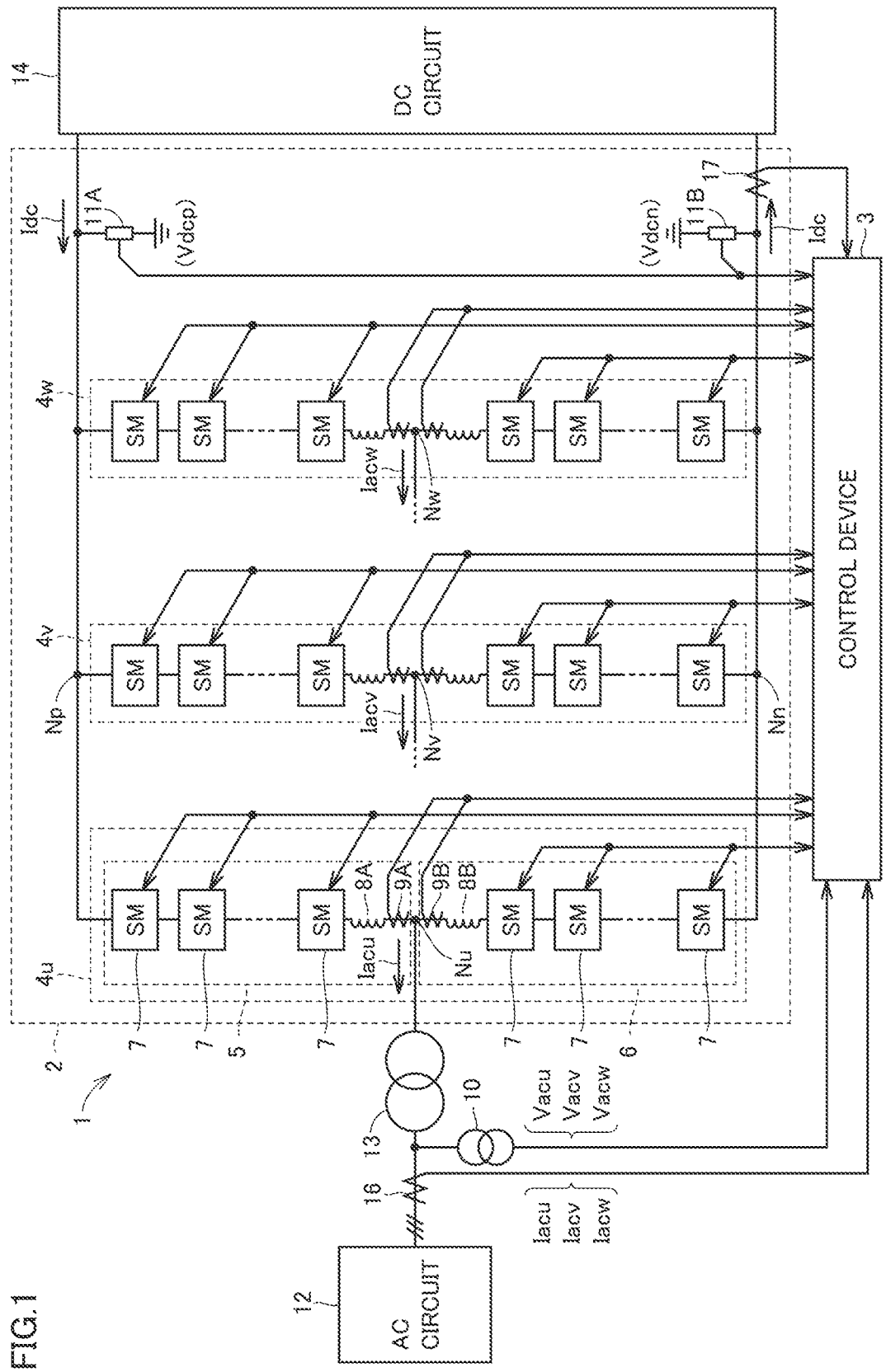
FIG. 1 is a schematic configuration diagram of a power conversion device 1 according to the present embodiment.

FIG. 1 is a schematic configuration diagram of a power conversion device 1 according to the present embodiment.

Referring to FIG. 1, power conversion device 1 is configured with a modular multilevel converter (MMC) including a plurality of converter cells connected in series to each other. The "converter cell" may be referred to as "submodule", SM, or "unit converter". Power conversion device 1 performs power conversion between a DC circuit 14 and an AC circuit 12. Power conversion device 1 includes a power converter 2 and a control device 3.

Power converter 2 includes a plurality of leg circuits 4u, 4v, and 4w (denoted as leg circuit 4 when they are collectively referred to or any one of them is referred to) connected in parallel with each other between a positive DC terminal (that is, high potential-side DC terminal) Np and a negative DC terminal (that is, low potential-side DC terminal) Nn.

Leg circuit 4 is provided for each of a plurality of phases forming alternating current. Leg circuit 4 is connected between AC circuit 12 and DC circuit 14 to perform power conversion between those circuits. In FIG. 1, AC circuit 12 is a three-phase alternating current system, and three leg circuits 4u, 4v, and 4w are provided respectively corresponding to U phase, V phase, and W phase.

AC input terminals Nu, Nv, and Nw respectively provided for leg circuits 4u, 4v, and 4w are connected to AC circuit 12 through a transformer 13. AC circuit 12 is, for example, an AC power system including an AC power source. In FIG. 1, for simplification of illustration, the connection between AC input terminals Nv, Nw and transformer 13 is not shown.

High potential-side DC terminal Np and low potential-side DC terminal Nn connected in common to leg circuits 4 are connected to DC circuit 14. DC circuit 14 is, for example, a DC power system including a DC power transmission network or a DC terminal of another power conversion device. In the latter case, two power conversion devices are coupled to form a back to back (BTB) system for connecting AC power systems having different rated frequencies.

AC circuit 12 may be connected through an interconnecting reactor, instead of using transformer 13 in FIG. 1. Furthermore, instead of AC input terminals Nu, Nv, and Nw, leg circuits 4u, 4v, and 4w may be provided with respective primary windings, and leg circuits 4u, 4v, and 4w may be connected in terms of alternating current to transformer 13 or the interconnecting reactor through secondary windings magnetically coupled to the primary windings. In this case, the primary windings may be reactors 8A and 8B described below. Specifically, leg circuits 4 are electrically (that is, in terms of direct current or alternating current) connected to AC circuit 12 through connections provided for leg circuits 4u, 4v, and 4w, such as AC input terminals Nu, Nv, and Nw or the primary windings.

Leg circuit 4u includes an upper arm 5 from high potential-side DC terminal Np to AC input terminal Nu and a lower arm 6 from low potential-side DC terminal Nn to AC input terminal Nu. AC input terminal Nu that is a connection point between upper arm 5 and lower arm 6 is connected to transformer 13. High potential-side DC terminal Np and low potential-side DC terminal Nn are connected to DC circuit 14. Leg circuits 4v and 4w have a similar configuration, and hereinafter the configuration of leg circuit 4u is explained as a representative example.

Upper arm 5 includes a plurality of converter cells 7 connected in cascade and a reactor 8A. Converter cells 7 and reactor 8A are connected in series. Similarly, lower arm 6 includes a plurality of converter cells 7 connected in cascade and a reactor 8B. Converter cells 7 and reactor 8B are connected in series. In the following description, the number of converter cells 7 included in each of upper arm 5 and lower arm 6 is denoted as Ncell. Ncell is ≥2.

Reactor 8A may be inserted at any position in upper arm 5 of leg circuit 4u, and reactor 8B may be inserted at any position in lower arm 6 of leg circuit 4u. A plurality of reactors 8A and a plurality of reactors 8B may be provided. The inductances of the reactors may be different from each other. Only reactor 8A of upper arm 5 or only reactor 8B of lower arm 6 may be provided. The transformer connection may be adjusted to cancel the magnetic flux of DC component current, and leakage reactance of the transformer may act on AC component current, as an alternative to the reactor. The provision of reactors 8A and 8B can suppress abrupt increase of accident current at a time of an accident in AC circuit 12 or DC circuit 14.

Power conversion device 1 further includes an AC voltage detector 10, an AC current detector 16, DC voltage detectors 11A and 11B, arm current detectors 9A and 9B provided for each leg circuit 4, and a DC current detector 17 as detectors for measuring the quantity of electricity (current, voltage, etc.) used in control. Signals detected by these detectors are input to control device 3.

In FIG. 1, the signal lines of signals input from the detectors to control device 3 and the signal lines of signals input and output between control device 3 and converter cells 7 are depicted partially collectively for the sake of ease of illustration, but, in actuality, they are provided individually for each detector and each converter cell 7. Signal lines between each converter cell 7 and control device 3 may be provided separately for transmission and reception. The signal lines are formed with, for example, optical fibers.

The detectors will now be specifically described.

AC voltage detector 10 detects U-phase AC voltage Vacu, V-phase AC voltage Vacv, and W-phase AC voltage Vacw of AC circuit 12. In the following description, Vacu, Vacv, and Vacw may be collectively referred to as Vac.

AC current detector 16 detects U-phase AC current Iacu, V-phase AC current Iacv, and W-phase AC current Iacw of AC circuit 12. In the following description, Iacu, Iacv, and Iacw may be collectively referred to as Iac.

DC voltage detector 11A detects DC voltage Vdcp at high potential-side DC terminal Np connected to DC circuit 14. DC voltage detector 11B detects DC voltage Vdcn at low potential-side DC terminal Nn connected to DC circuit 14. The difference between DC voltage Vdcp and DC voltage Vdcn is defined as DC voltage Vdc. DC current detector 17 detects DC current Idc flowing through high potential-side DC terminal Np or low potential-side DC terminal Nn.

Arm current detectors 9A and 9B provided in leg circuit 4u for U phase respectively detect upper arm current Ipu flowing through upper arm 5 and lower arm current Inu flowing through lower arm 6. Arm current detectors 9A and 9B provided in leg circuit 4v for V phase respectively detect upper arm current Ipv and lower arm current Inv. Arm current detectors 9A and 9B provided in leg circuit 4w for W phase respectively detect upper arm current Ipw and lower arm current Inw. In the following description, upper arm currents Ipu, Ipv, and Ipw may be collectively referred to as upper arm current Iarmp, lower arm currents Inu, Inv, and Inw may be collectively referred to as lower arm current Iarmn, and upper arm current Iarmp and lower arm current Iarmn may be collectively referred to as Iarm.

(Configuration Example of Converter Cell)

Figure 2:
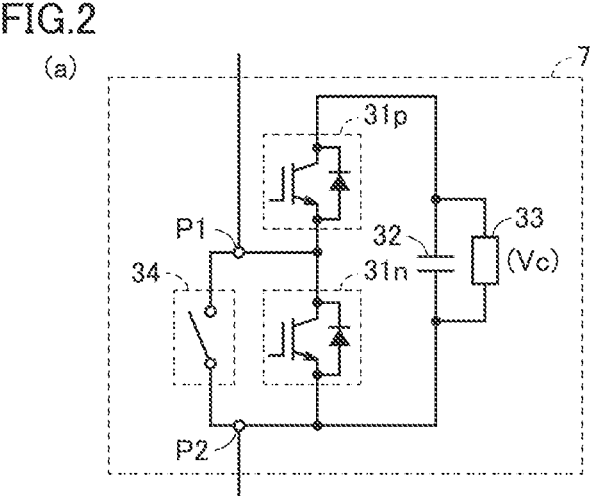
FIG. 2 is a circuit diagram showing a configuration example of a converter cell 7 that constitutes a power converter 2.
Figure 2:
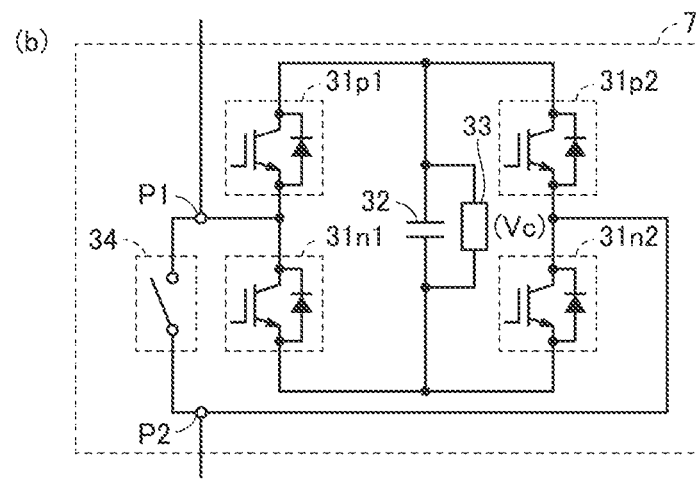

FIG. 2 is a circuit diagram showing a configuration example of converter cell 7 that constitutes power converter 2.

Converter cell 7 shown in FIG. 2(a) has a circuit configuration called half bridge configuration. This converter cell 7 includes a series of two switching elements 31p and 31n connected in series, a power storage element 32, a voltage detector 33, input/output terminals P1 and P2, and a bypass switch 34. The series of switching elements 31p and 31n and power storage element 32 are connected in parallel. Voltage detector 33 detects voltage Vc between both ends of power storage element 32.

Both terminals of switching element 31n are connected to input/output terminals P1 and P2. With switching operation of switching elements 31p and 31n, converter cell 7 outputs voltage Vc of power storage element 32 or zero voltage between input/output terminals P1 and P2. When switching element 31p is turned ON and switching element 31n is turned OFF, voltage Vc of power storage element 32 is output from converter cell 7. When switching element 31p is turned OFF and switching element 31n is turned ON, converter cell 7 outputs zero voltage.

Both terminals of bypass switch 34 are connected to input/output terminals P1 and P2. Bypass switch 34 is controlled to an open state when converter cell 7 operates normally. Bypass switch 34 is controlled to a closed state when a part such as switching elements 31p, 31n of converter cell 7 is abnormal. Thus, arm current Iarm flows through bypass switch 34 so that the operation of power conversion device 1 can be continued. A mechanical switch may be used or a semiconductor switching element may be used as bypass switch 34.

In power conversion device 1 in a third embodiment, bypass switch 34 is controlled to a closed state so that power storage element 32 of converter cell 7 with highest capacitor voltage Vc is not charged any more. The detail will be described later.

Converter cell 7 shown in FIG. 2(b) has a circuit configuration called full bridge configuration. This converter cell 7 includes a first series of two switching elements 31p1 and 31n1 connected in series, a second series of two switching elements 31p2 and 31n2 connected in series, a power storage element 32, a voltage detector 33, input/output terminals P1 and P2, and a bypass switch 34. The first series, the second series, and power storage element 32 are connected in parallel. Voltage detector 33 detects voltage Vc between both ends of power storage element 32.

The middle point of switching element 31p1 and switching element 31n1 is connected to input/output terminal P1. Similarly, the middle point of switching element 31p2 and switching element 31n2 is connected to input/output terminal P2. With switching operation of switching elements 31p1, 31n1, 31p2, and 31n2, converter cell 7 outputs voltage Vc, −Vc of power storage element 32 or zero voltage between input/output terminals P1 and P2.

Both terminals of bypass switch 34 are connected to input/output terminals P1 and P2, in the same manner as in FIG. 2(a).

In FIG. 2(a) and FIG. 2(b), switching elements 31p, 31n, 31p1, 31n1, 31p2, and 31n2 are configured, for example, such that a freewheeling diode (FWD) is connected in anti-parallel with a self-turn-off semiconductor switching element such as an insulated gate bipolar transistor (IGBT) or a gate commutated turn-off (GCT) thyristor.

In FIG. 2(a) and FIG. 2(b), a capacitor such as a film capacitor is mainly used for power storage element 32. Power storage element 32 may hereinafter be called capacitor. In the following, voltage Vc of power storage element 32 may be referred to as capacitor voltage Vc.

As shown in FIG. 1, converter cells 7 are connected in cascade. In each of FIG. 2(a) and FIG. 2(b), in converter cell 7 arranged in upper arm 5, input/output terminal P1 is connected to input/output terminal P2 of adjacent converter cell 7 or high potential-side DC terminal Np, and input/output terminal P2 is connected to input/output terminal P1 of adjacent converter cell 7 or AC input terminal Nu. Similarly, in converter cell 7 arranged in lower arm 6, input/output terminal P1 is connected to input/output terminal P2 of adjacent converter cell 7 or AC input terminal Nu, and input/output terminal P2 is connected to input/output terminal P1 of adjacent converter cell 7 or low potential-side DC terminal Nn.

In the following, converter cell 7 has the half bridge cell configuration shown in FIG. 2(a), and a semiconductor switching element is used as a switching element, and a capacitor is used as a power storage element, by way of example. However, converter cell 7 that constitutes power converter 2 may have the full bridge configuration shown in FIG. 2(b). A converter cell having a configuration other than those illustrated in the examples above, for example, a converter cell having a circuit configuration called clamped double cell may be used, and the switching element and the power storage element are also not limited to the examples above.

(Control Device)

Figure 3:
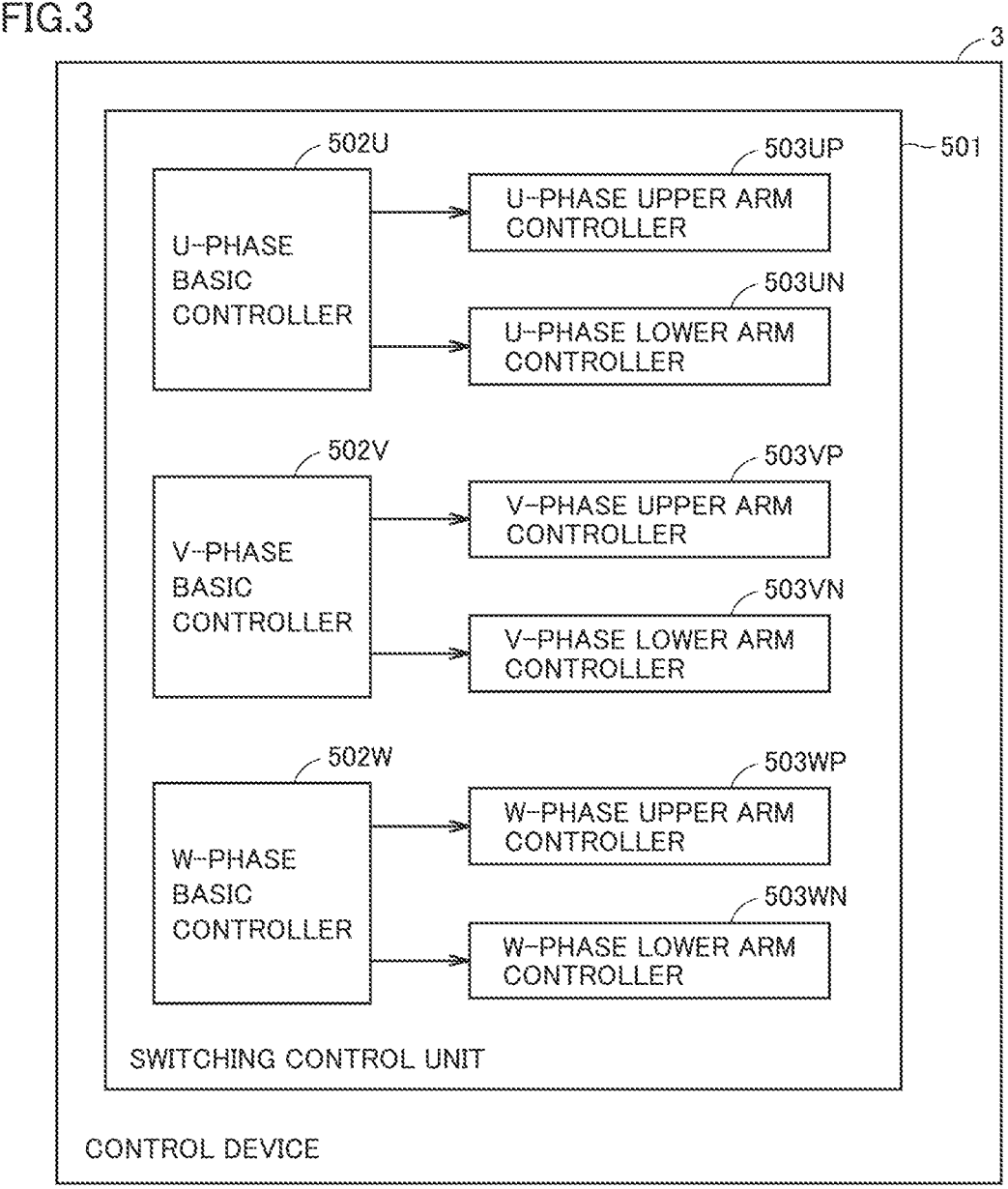
FIG. 3 is a functional block diagram illustrating an internal configuration of a control device 3 shown in FIG. 1.

FIG. 3 is a functional block diagram illustrating an internal configuration of control device 3 shown in FIG. 1.

Referring to FIG. 3, control device 3 includes a switching control unit 501 for controlling ON and OFF of switching elements 31p and 31n of each converter cell 7.

Switching control unit 501 includes a U-phase basic controller 502U, a U-phase upper arm controller 503UP, a U-phase lower arm controller 503UN, a V-phase basic controller 502V, a V-phase upper arm controller 503VP, a V-phase lower arm controller 503VN, a W-phase basic controller 502W, a W-phase upper arm controller 503WP, and a W-phase lower arm controller 503WN.

In the following description, U-phase basic controller 502U, V-phase basic controller 502V, and W-phase basic controller 502W may be collectively referred to as basic controller 502. Similarly, U-phase upper arm controller 503UP, U-phase lower arm controller 503UN, V-phase upper arm controller 503VP, V-phase lower arm controller 503VN, W-phase upper arm controller 503WP, and W-phase lower arm controller 503WN may be collectively referred to as arm controller 503.

Figure 4:
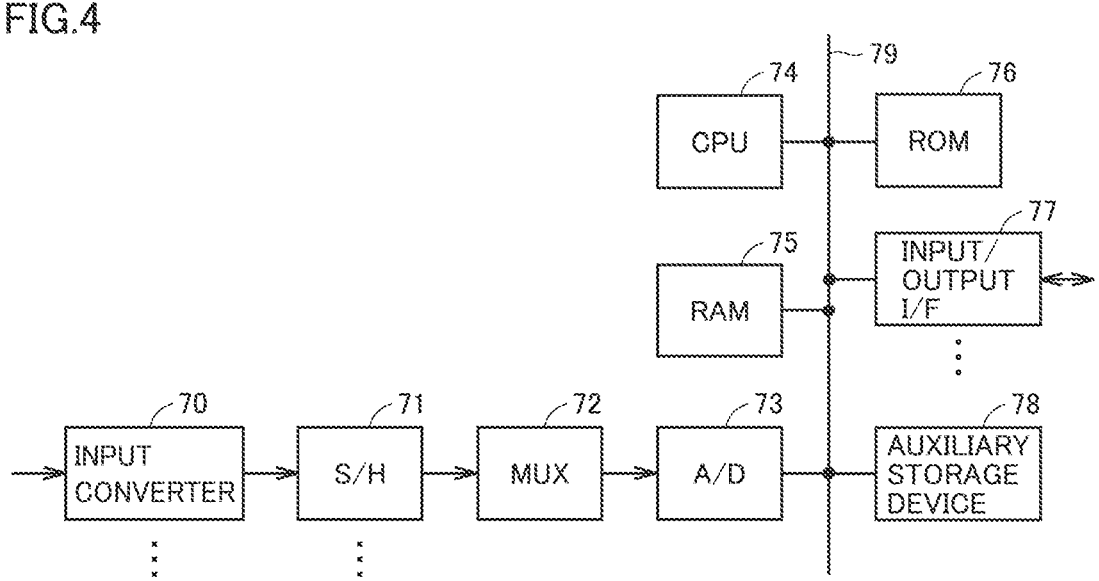
FIG. 4 is a block diagram showing a hardware configuration example of the control device.

FIG. 4 is a block diagram showing a hardware configuration example of the control device. FIG. 4 shows an example in which control device 3 is configured with a computer.

Referring to FIG. 4, control device 3 includes one or more input converters 70, one or more sample hold (S/H) circuits 71, a multiplexer (MUX) 72, and an analog-to-digital (A/D) converter 73. Control device 3 further includes one or more central processing units (CPU) 74, random access memory (RAM) 75, and read only memory (ROM) 76. Control device 3 further includes one or more input/output interfaces 77, an auxiliary storage device 78, and a bus 79 connecting the components above to each other.

Input converter 70 includes an auxiliary transformer (not shown) for each input channel. Each auxiliary transformer converts a detection signal from each electrical quantity detector in FIG. 1 into a signal having a voltage level suitable for subsequent signal processing.

Sample hold circuit 71 is provided for each input converter 70. Sample hold circuit 71 samples and holds a signal representing the electrical quantity received from the corresponding input converter 70 at a predetermined sampling frequency.

Multiplexer 72 successively selects the signals held by a plurality of sample hold circuits 71. A/D converter 73 converts a signal selected by multiplexer 72 into a digital value. A plurality of A/D converters 73 may be provided to perform A/D conversion of detection signals of a plurality of input channels in parallel.

CPU 74 controls the entire control device 3 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detection values.

Input/output interface 77 is an interface circuit for communication between CPU 74 and an external device.

Unlike the example in FIG. 3, at least a part of control device 3 may be configured using circuitry such as a field programmable gate array (FPGA) and an application specific integrated circuit (ASIC). That is, the function of each functional block illustrated in FIG. 3 may be configured based on the computer illustrated in FIG. 4 or may be at least partially configured with circuitry such as an FPGA and an ASIC. At least a part of the function of each functional block may be configured with an analog circuit.

Figure 5:
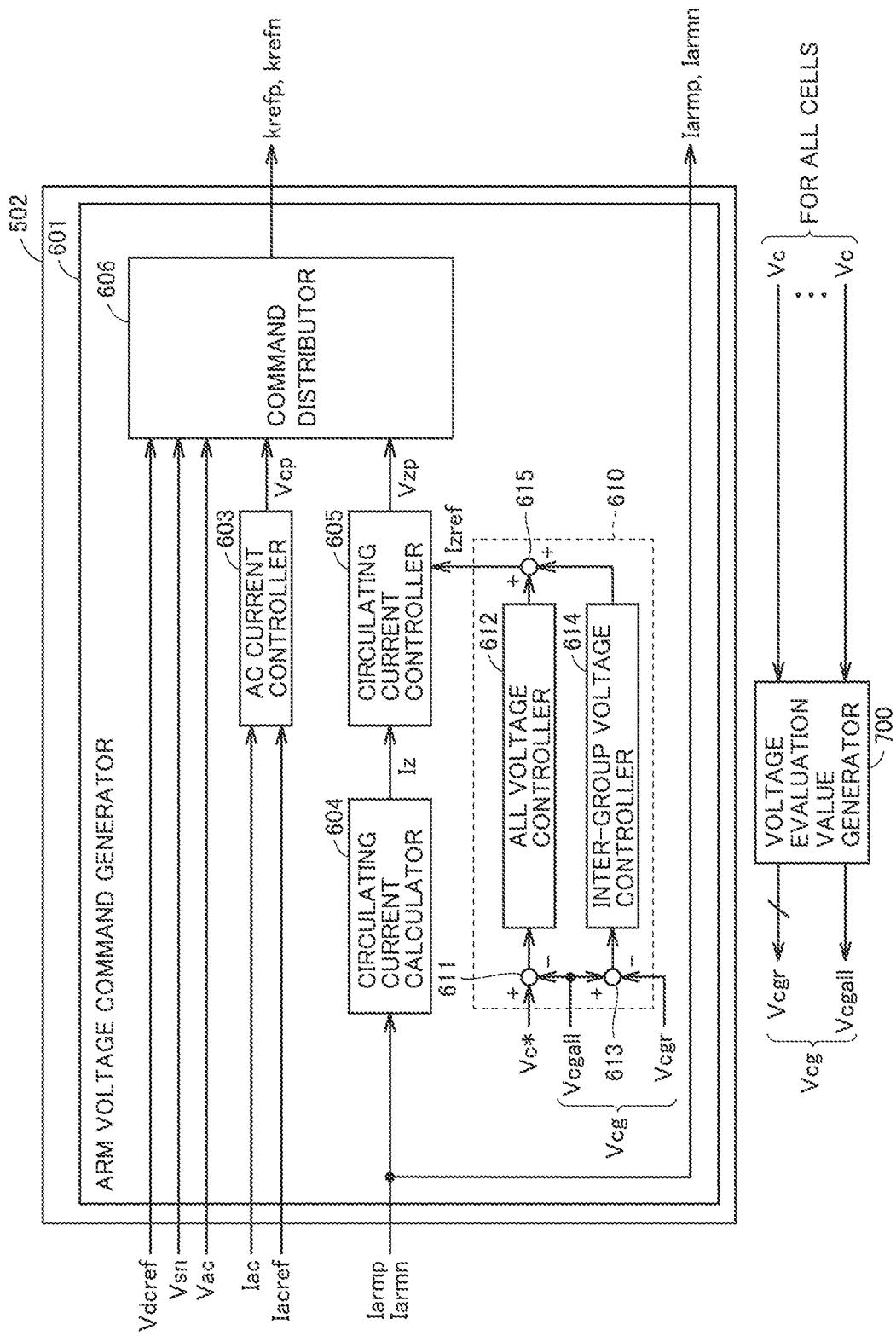
FIG. 5 is a block diagram illustrating a configuration example of a basic controller 502 shown in FIG. 3.

FIG. 5 is a block diagram illustrating a configuration example of basic controller 502 shown in FIG. 3.

Referring to FIG. 5, basic controller 502 includes an arm voltage command generator 601. Control device 3 further includes a voltage evaluation value generator 700 to generate a voltage evaluation value Vcg to be used in arm voltage command generator 601.

Arm voltage command generator 601 calculates an arm voltage command value krefp for the upper arm and an arm voltage command value krefn for the lower arm. In the following description, krefp and krefn are collectively referred to as kref.

Voltage evaluation value generator 700 receives capacitor voltage Vc detected by voltage detector 33 in each converter cell 7. Voltage evaluation value generator 700 generates, from capacitor voltage Vc of each converter cell 7, an all voltage evaluation value Vcga11 for evaluating the total sum of stored energy of capacitors 32 of all converter cells 7 in power converter 2 and a group voltage evaluation value Vcgr indicating the total sum of stored energy of capacitors 32 of converter cells 7 in each of predetermined groups.

For example, group voltage evaluation value Vcgr includes a U-phase voltage evaluation value Vcgu, a V-phase voltage evaluation value Vcgv, and a V-phase voltage evaluation value Vcgv for evaluating the total sum of stored energy of a plurality of (2×Nec11) converter cells 7 included in each of leg circuits 4u (U phase), 4v (V phase), and 4w (W phase). Alternatively, instead of or in addition to the voltage evaluation value for each leg circuit 4 (U phase, V phase, W phase), group voltage evaluation value Vcgr may include group voltage evaluation value Vcgr for evaluating the total sum of stored energy of a plurality of (Nec11) converter cells 7 for each of upper arm 5 and lower arm 6 for each leg circuit 4. In the present embodiment, all voltage evaluation value Vcga11 and group voltage evaluation value Vcgr generated by voltage evaluation value generator 700 are collectively referred to as voltage evaluation value Vcg.

These voltage evaluation values Vcg are determined as the mean value of capacitor voltages Vc of all of converter cells 7 in power converter 2 or the mean value of capacitor voltages Vc of a plurality of converter cells 7 belonging to each group (each phase leg circuit or each arm).

Arm voltage command generator 601 includes an AC current controller 603, a circulating current calculator 604, a circulating current controller 605, a command distributor 606, and a voltage macro controller 610.

AC current controller 603 calculates an AC control command value Vcp such that the deviation between the detected AC current Iac and the set AC current command value Iacref becomes zero.

Circulating current calculator 604 calculates circulating current Iz flowing through one leg circuit 4, based on arm current Iarmp of the upper arm and arm current Iarmn of the lower arm. Circulating current is current circulating between a plurality of leg circuits 4. For example, circulating current Iz flowing through one leg circuit 4 can be calculated by the following equations (1) and (2).

$$Idc=(Ipu+Ipv+Ipw+Inu+Inv+Inw)/2 \quad (1)$$

$$Iz=(Iarmp+Iarmn)/2-Idc/3 \quad (2)$$

Voltage macro controller 610 generates a circulating current command value Izref so as to compensate for deficiency and excess of stored energy in all of converter cells 7 in power converter 2 and imbalance of stored energy between groups (between phase leg circuits or between arms), based on voltage evaluation value Vcg generated by voltage evaluation value generator 700.

For example, voltage macro controller 610 includes subtractors 611 and 613, an all voltage controller 612, an inter-group voltage controller 614, and an adder 615.

Subtractor 611 subtracts all voltage evaluation value Vcgall generated by voltage evaluation value generator 700 from all voltage command value Vc*. All voltage command value Vc* is a reference value of capacitor voltage Vc corresponding to a reference value of stored energy in capacitor 32 in each converter cell 7. All voltage controller 612 performs computation on the deviation of all voltage evaluation value Vcgall from all voltage command value Vc* calculated by subtractor 611 to generate a first current command value Izref1. First current command value Izref1 corresponds to a circulating current value for eliminating deficiency and excess of stored energy in all of converter cells 7 in power converter 2 by controlling the entire level of capacitor voltages Vc of converter cells 7 to all voltage command value Vc*.

Similarly, subtractor 613 subtracts group voltage evaluation value Vcgr from all voltage evaluation value Vcgall. For example, when basic controller 502 is U-phase basic controller 502, U-phase voltage evaluation value Vcgu is input as group voltage evaluation value Vcgr to subtractor 613. Inter-group voltage controller 614 performs computation on the deviation of group voltage evaluation value Vcgr (U-phase voltage evaluation value Vcgu) from all voltage evaluation value Vcgall calculated by subtractpr 613 to generate a second current command value Izref2. Second current command value Izref2 corresponds to a circulating current value for eliminating imbalance of stored energy in converter cells 7 between groups by equalizing the level of capacitor voltages Vc of converter cells 7 between groups (here, between leg circuits of individual phases).

For example, all voltage controller 612 and inter-group voltage controller 614 may be configured as PI controllers that perform proportional computation and integral computation for the deviation calculated by subtractors 611 and 613 or may be configured as a PID controller that additionally performs differential computation. Alternatively, all voltage controller 612 and inter-group voltage controller 614 may be configured using a configuration of another controller commonly used in feedback control.

Adder 615 adds first current command value Izref1 from all voltage controller 612 to second current command value Izref2 from inter-group voltage controller 614 to generate circulating current command value Izref.

Circulating current controller 605 calculates a circulation control command value Vzp to perform control such that circulating current Iz calculated by circulating current calculator 604 follows circulating current command value Izref set by voltage macro controller 610. Circulating current controller 605 can also be configured with a controller that performs PI control or PID control for the deviation of circulating current Iz from circulating current command value Izref. That is, voltage macro controller 610 using voltage evaluation value Vcg forms a minor loop to control circulating current to suppress deficiency and excess of stored energy in all of converter cells 7 or a plurality of converter cells 7 in each group.

Command distributor 606 receives AC control command value Vcp, circulation control command value Vzp, DC voltage command value Vdcref, neutral point voltage Vsn, and AC voltage Vac. Since the AC side of power converter 2 is connected to AC circuit 12 through transformer 13, neutral point voltage Vsn can be determined from the voltage of DC power source of DC circuit 14. DC voltage command value Vdcref may be given by DC output control or may be a constant value.

Command distributor 606 calculates voltage shares output by the upper arm and the lower arm, based on these inputs. Command distributor 606 determines arm voltage command value krefp of the upper arm and arm voltage command value krefn of the lower arm by subtracting a voltage drop due to an inductance component in the upper arm or the lower arm from the calculated voltage.

The determined arm voltage command value krefp of the upper arm and arm voltage command value krefn of the lower arm serve as output voltage commands to allow AC current Iac to follow AC current command value Iacref, allow circulating current Iz to follow circulating current command value Izref, allow DC voltage Vdc to follow DC voltage command value Vdcref, and perform feed forward control of AC voltage Vac. In this way, circulation control command value Vzp for allowing circulating current Iz to follow circulating current command value Izref is reflected in arm voltage command values krefp and krefn. That is, circulating current command value Izref calculated by voltage macro controller 610 or circulation control command value Vzp corresponds to an embodiment of "control value" set in common to Ncell converter cells 7 included in the same arm.

Basic controller 502 outputs arm current Iarmp of the upper arm, arm current Iarmn of the lower arm, arm voltage command value krefp of the upper arm, and arm voltage command value krefn of the lower arm.

Figure 6:
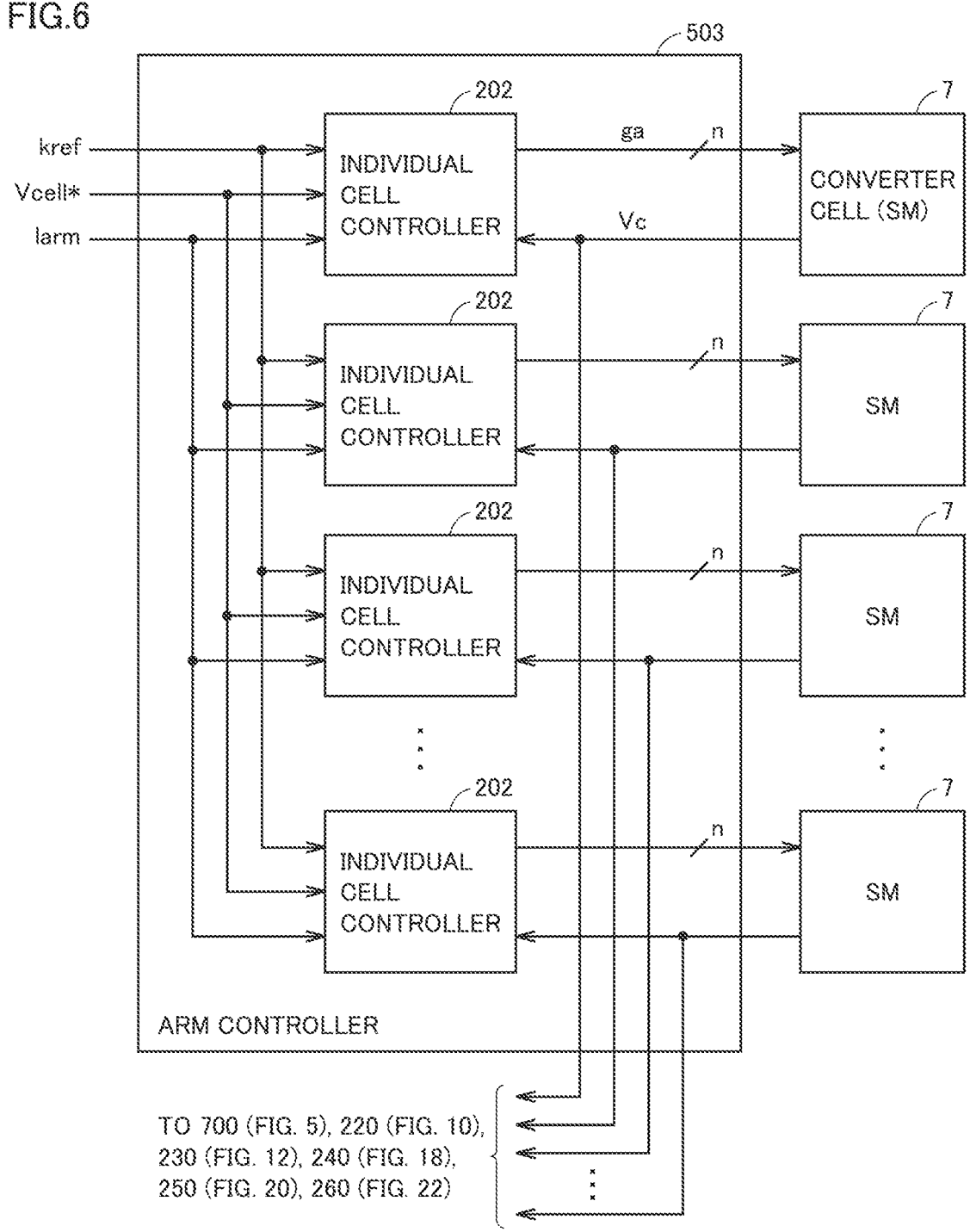
FIG. 6 is a block diagram illustrating a configuration example of an arm controller 503.

FIG. 6 is a block diagram illustrating a configuration example of arm controller 503.

Referring to FIG. 6, arm controller 503 includes Ncell individual cell controllers 202.

Each of individual cell controllers 202 individually controls the corresponding converter cell 7. Individual cell controller 202 receives arm voltage command value kref, arm current Iarm, and capacitor voltage command value Vcell* from basic controller 502.

Individual cell controller 202 generates a gate signal ga for the corresponding converter cell 7 and outputs the generated gate signal ga to the corresponding converter cell 7. Gate signal ga is a signal controlling ON and OFF of switching elements $31p$ and $31n$ in converter cell 7 in FIG. 2(a) (n=2). When converter cell 7 has the full bridge configuration in FIG. 2(b), the respective gate signals of switching elements $31p1$, $31n1$, $31p2$, and $31n2$ are generated (n=4). On the other hand, the detection value (capacitor voltage Vc) from voltage detector 33 in each converter cell 7 is sent to voltage evaluation value generator 700 shown in FIG. 5.

Figure 7:
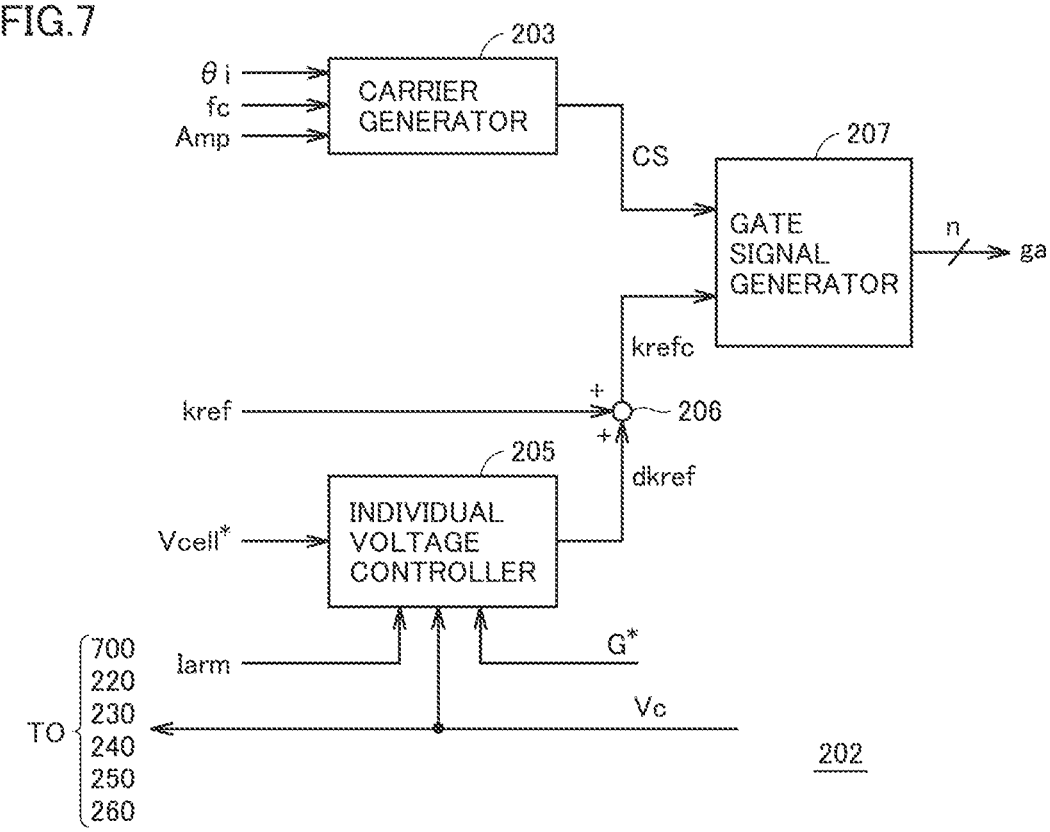
FIG. 7 is a block diagram showing a configuration example of an individual cell controller 202 shown in FIG. 6.

FIG. 7 is a block diagram showing a configuration example of individual cell controller 202 shown in FIG. 6.

Referring to FIG. 7, individual cell controller 202 includes a carrier generator 203, an individual voltage controller 205, an adder 206, and a gate signal generator 207.

Carrier generator 203 generates a carrier signal CS having a predetermined carrier frequency fc, phase $\theta i$, and amplitude Amp for use in phase shift pulse width modulation (PWM) control. The phase shift PWM control shifts the timings (that is, phases $\theta i$) of PWM signals from each other to be output to a plurality of (Ncell) converter cells 7 that constitute the same arm (upper arm 5 or lower arm 6). It is known that this can reduce harmonic components included in a synthesized voltage of output voltages of converter cells 7.

For example, a carrier controller 230 (see FIG. 12) provided in control device 3 transmits the setting values of carrier frequency fc, phase $\theta i$, and amplitude Amp to carrier generator 203 of each individual cell controller 202 provided in each arm controller 503. In this case, the setting values of phase $\theta i$ are shifted from each other between Ncell converter cells 7 that constitute each arm. Carrier generator 203 of each individual cell controller 202 generates carrier signal CS based on the received setting values of carrier frequency fc, phase $\theta i$, and amplitude Amp.

Individual voltage controller 205 receives voltage command value Vcell*, capacitor voltage Vc of the corresponding converter cell 7, and arm current of the arm to which the corresponding converter cell 7 belongs. Voltage command value Vcell* can be set to a value (fixed value) common to voltage command value Vc* of all voltage controller 612 in FIG. 5. Alternatively, in order to equalize capacitor voltage Vc in the same arm, voltage command value Vcell* may be set to the mean value of capacitor voltages of Ncell converter cells 7 included in the same arm.

Individual voltage controller 205 performs computation on the deviation of capacitor voltage Vc from voltage command value Vcell* to calculate a control output dkref for individual voltage control. Individual voltage controller 205 can also be configured with a controller that performs PI control or PID control. Furthermore, control output dkref for charging and discharging capacitor 32 in a direction that eliminates the deviation is calculated by multiplying the computed value by the controller by "+1" or "−1" in accordance with the polarity of arm current Iarm. Alternatively, control output dkref for charging and discharging capacitor 32 in a direction that eliminates the deviation may be calculated by multiplying the computed value by the controller by arm current Iarm.

In the case of power conversion device 1 in the first embodiment, the setting value of gain G* is further input to individual voltage controller 205. Control output dkref for individual voltage control output from individual voltage controller 205 is produced by multiplying gain G*. The detail of individual voltage controller 205 in the first embodiment will be described later with reference to FIG. 9.

Adder 206 adds arm voltage command value kref from basic controller 502 to control output dkref of individual voltage controller 205 and outputs a cell voltage command value krefc.

Gate signal generator 207 generates gate signal ga by performing PWM modulation of cell voltage command value krefc by carrier signal CS from carrier generator 203.

Figure 8:
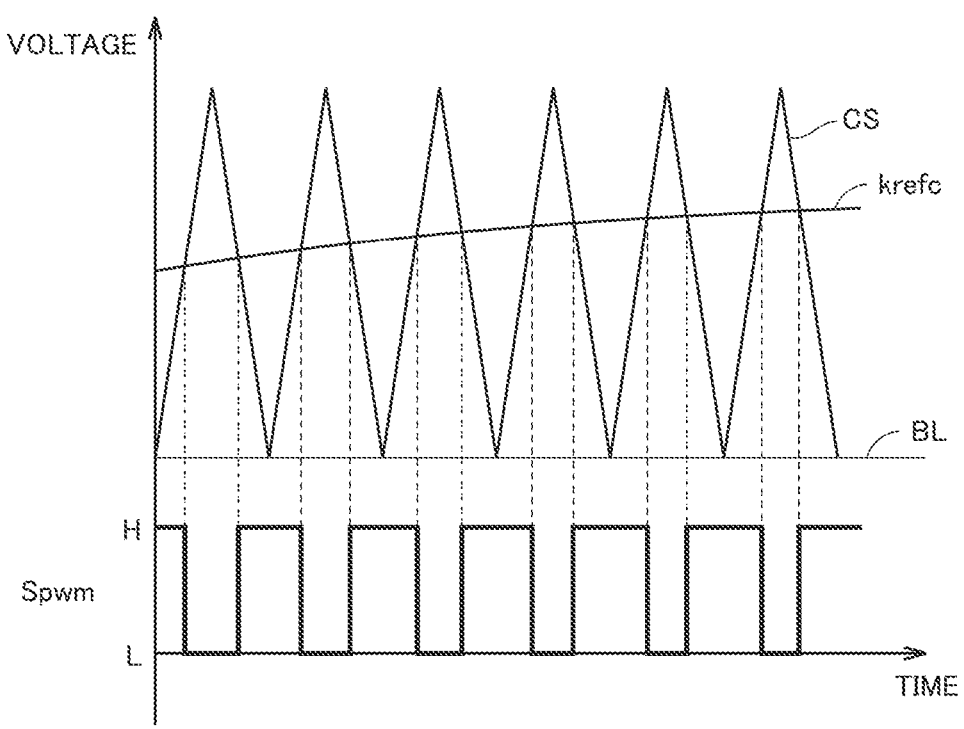
FIG. 8 is a conceptual waveform diagram for explaining PWM modulation control by a gate signal generator shown in in FIG. 7.

FIG. 8 is a conceptual waveform diagram for explaining PWM modulation control by the gate signal generator shown in in FIG. 7. The signal waveforms shown in FIG. 8 are exaggerated for explanation and do not illustrate actual signal waveforms as they are.

Referring to FIG. 8, cell voltage command value krefc is compared in voltage with carrier signal CS typically formed with triangular waves. When the voltage of cell voltage command value krefc is higher than the voltage of carrier signal CS, a PWM modulation signal Spwm is set to high level (H level). Conversely, when the voltage of carrier signal CS is higher than the voltage of cell voltage command value krefc, PWM modulation signal Spwm is set to low level (L level).

For example, in the H level period of PWM modulation signal Spwm, gate signal ga (n=2) is generated such that switching element $31p$ is turned ON and switching element $31n$ is turned OFF in converter cell 7 in FIG. 2(a). Conversely, in the L level period of PWM modulation signal Spwm, gate signal ga (n=2) is generated such that switching element $31n$ is turned ON and switching element $31p$ is turned OFF.

Gate signal ga is sent to a gate driver (not shown) of switching element $31p$, $31n$ in converter cell 7, whereby ON and OFF of switching elements $31p$ and $31n$ in converter cell 7 is controlled.

Cell voltage command value krefc corresponds to a sinusoidal voltage corrected by control output dkref. In control device 3, therefore, a modulation ratio command value in PWM modulation can be calculated by a known method from the amplitude (or the effective value) of the sinusoidal voltage (arm voltage command value kref) and the amplitude of carrier signal CS.

In this way, it is understood that in the power conversion device according to the present embodiment, capacitor voltage Vc of converter cell 7 is controlled in multiple levels including individual control (individual voltage controller 205) for each converter cell 7 and macro control (voltage macro controller 610) for controlling the stored energy in the entire power converter 2 or a plurality of converter cells 7 in the same group (each phase leg circuit or arm).

(Cause of Variations in Capacitor Voltage in Individual Control)

Even when voltage macro controller 610 in FIG. 5 corrects deficiency and excess of stored energy in all of converter cells 7 in power converter 2 and imbalance in stored energy between groups (between phase leg circuits or between arms), the individual control in individual cell controller 202 sometimes does not function well and individual capacitor voltages Vc may vary. As a result, the capacitor voltage Vc of any converter cell 7 excessively rises or excessively lowers to the level of overvoltage protection or undervoltage protection, which may cause the MMC to stop operating.

As described above, the first cause of variations of individual capacitor voltages Vc is that arm current Iarm is extremely small. For example, arm current Iarm is small when AC power input or output between AC circuit 12 and power conversion device 1 is small. Current flowing through individual converter cell 7 becomes small when arm current Iarm is small, so that current charged into power storage element 32 or discharged from power storage element 32 also becomes small. As a result, individual control does not work well and individual capacitor voltages Vc vary. If variations of individual capacitor voltages Vc are left, the variations may further increase.

The second cause is the effect of harmonic components included in arm current Iarm and the output voltage of each converter cell 7. As described with reference to FIG. 7, since phase shift PWM control is used for the switching control of each converter cell 7, the phases of output voltages of converter cells 7 included in the same arm are different from each other. On the other hand, current flowing through converter cells 7 included in the same arm is common and therefore the phase of current is the same. Therefore, harmonic current may be charged into the capacitor and harmonic current may be discharged from the capacitor, depending on the phase relation between harmonic a voltage component and a harmonic current component for each converter cell 7. In converter cell 7 having the phase relation between voltage and current in the former case, capacitor voltage Vc gradually increases, whereas in converter cell 7 having the phase relation between voltage and current in the latter case, capacitor voltage Vc gradually decreases. As a result, unbalance occurs in capacitor voltages Vc of individual converter cells 7.

In power conversion device 1 in the first embodiment, a gain multiplier 212 is provided for increasing control output dkref of individual voltage controller 205 in FIG. 7 when variations of individual capacitor voltages Vc are great. Increasing control output dkref enhances the effectiveness of individual control. Hereinafter, the detailed configuration of individual voltage controller 205 and the configuration and operation of gain controller 220 for controlling the value of gain G* will be described.

(Detailed Configuration of Individual Voltage Controller)

Figure 9:
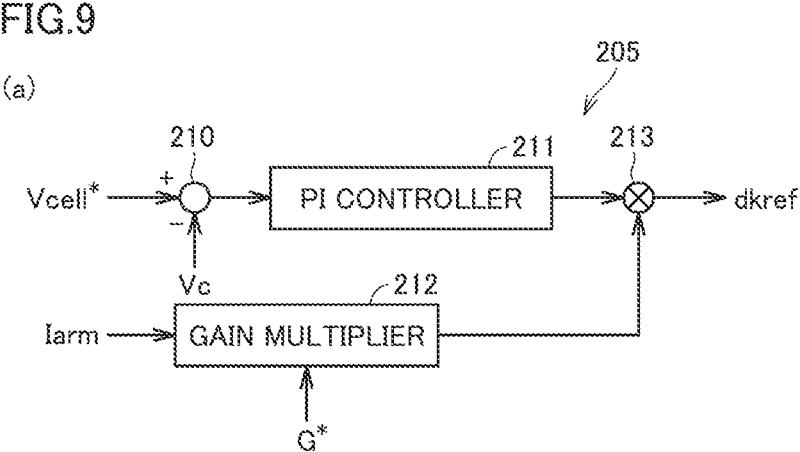
FIG. 9 is a block diagram showing a configuration example of an individual voltage controller in detail.
Figure 9:
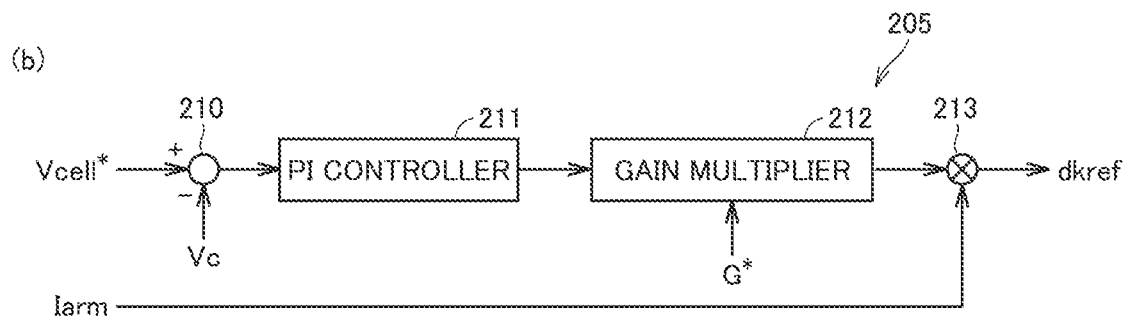
Figure 9:
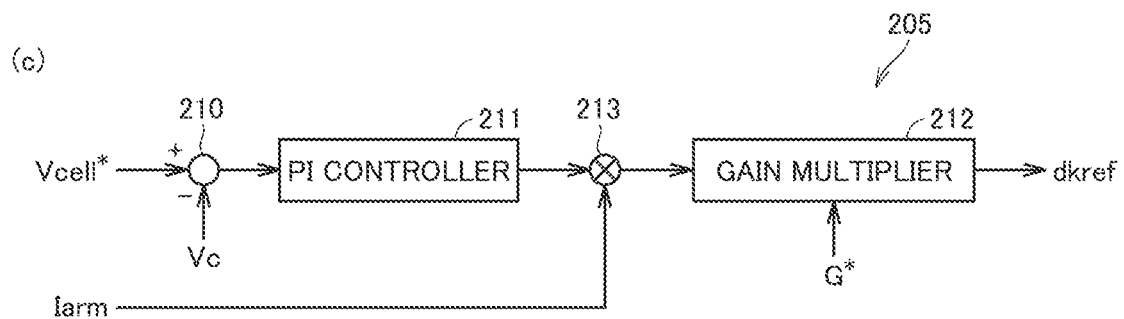

FIG. 9 is a block diagram showing a configuration example of the individual voltage controller in detail. FIGS. 9(a) to (c) show three configurations different depending on the arrangement position of gain multiplier 212.

Referring to FIG. 9(a), individual voltage controller 205 includes a subtractor 210, a PI controller 211, a gain multiplier 212, and a multiplier 213.

Subtractor 210 calculates a deviation of capacitor voltage Vc from voltage command value Vcell*. PI controller 211 performs proportional computation and integral computation for the deviation calculated by subtractor 210. Instead of PI controller 211, a PID controller that further performs differential computation or a feedback controller having another configuration may be used.

Gain multiplier 212 multiplies arm current Iarm by gain G*. The setting value of gain G* is given from gain controller 220 described later with reference to FIG. 10. Multiplier 213 multiplies the computation result of PI controller 211 by the multiplication result of gain multiplier 212 to generate control output dkref of individual voltage controller 205.

The components of individual voltage controller 205 shown in FIG. 9(c) are the same as in FIG. 9(a) but the arrangement position of gain multiplier 212 is different from that in FIG. 9(a). Specifically, gain multiplier 212 is provided at a subsequent stage of PI controller 211 and a preceding stage of multiplier 213. Gain multiplier 212 multiplies the computation result of PI controller 211 by gain G*. Multiplier 213 multiplies the computation result of gain multiplier 212 by arm current Iarm to generate control output dkref.

The components of individual voltage controller 205 shown in FIG. 9(b) are the same as in FIGS. 9(a) and (b) but the arrangement position of gain multiplier 212 is different from that in FIGS. 9(a) and (b). Specifically, gain multiplier 212 is provided at a subsequent stage of multiplier 213. Multiplier 213 multiplies the computation result of PI controller 211 by arm current Iarm. Gain multiplier 212 multiplies the multiplication result of multiplier 213 by gain G* to generate control output dkref.

As is clear from the description above, in individual voltage controller 205 in FIGS. 9(a) to (c), the computation order is different but the value of the finally generated control output dkref is the same. Multiplier 213 may multiply the other input value by the sign "+1" or "−1" corresponding to the polarity of arm current Iarm, instead of arm current Iarm.

(Configuration and Operation of Gain Controller)

Figure 10:
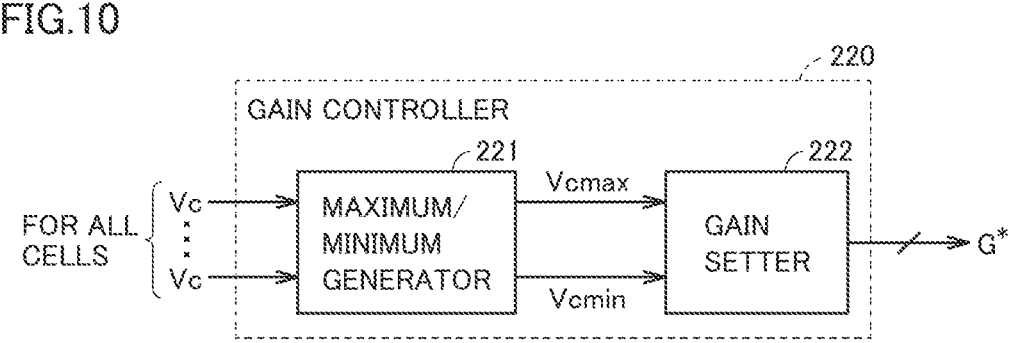
FIG. 10 is a block diagram showing a configuration example of a gain controller.

FIG. 10 is a block diagram showing a configuration example of the gain controller. Control device 3 further includes gain controller 220 to generate a setting value of gain G* to be used in individual voltage controller 205.

As shown in FIG. 10, gain controller 220 includes a maximum/minimum generator 221 receiving capacitor voltage Vc detected by voltage detector 33 in each converter cell 7 and a gain setter 222. Maximum/minimum generator 221 determines maximum value Vcmax and minimum value Vcmin of capacitor voltages Vc of all of converter cells 7. Gain setter 222 receives maximum value Vcmax and minimum value Vcmin determined by maximum/minimum generator 221.

Figure 11:
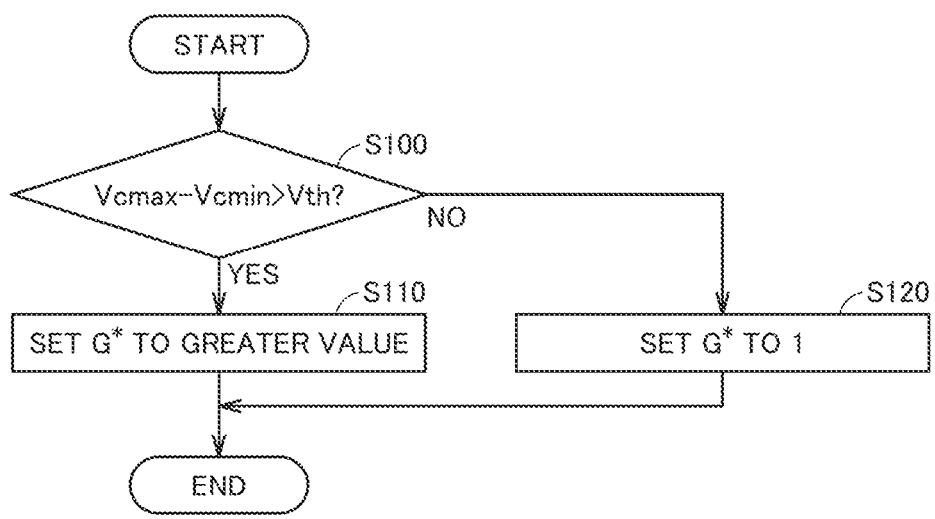
FIG. 11 is a flowchart showing the operation of a gain setter in FIG. 10.

FIG. 11 is a flowchart showing the operation of the gain setter in FIG. 10. Referring to FIG. 11, if the difference between maximum value Vcmax and minimum value Vcmin of capacitor voltages Vc of all of converter cells 7 is greater than a threshold value Vth (YES at step S100), gain setter 222 sets gain G* to a value greater than 1 (step S110). Increasing control gain G* in this way increases control output dkref of individual voltage controller 205, thereby enhancing the effectiveness of individual control. As a result, variations of individual capacitor voltages Vc can be suppressed.

On the other hand, if the difference between maximum value Vcmax and minimum value Vcmin of capacitor voltages Vc is equal to or smaller than threshold value Vth (NO at step S100), gain setter 222 sets gain G* to 1 (step S120).

Maximum/minimum generator 221 may determine the maximum value and the minimum value after applying a high cutoff filter on the time-series data of input capacitor voltage Vc of each converter cell 7.

Instead of the difference between maximum value Vcmax and minimum value Vcmin of capacitor voltages Vc, the variance or the standard deviation of capacitor voltages Vc of all of converter cells 7 may be used, and any evaluation value that represents the degree of variations can be used. Thus, gain setter 222 sets control gain G* to a value greater than 1 if the evaluation value representing the degree of variations is greater than a threshold value, and sets control gain G* to 1 if the evaluation value representing the degree of variations is equal to or smaller than a threshold value.

Effects of First Embodiment

As described above, in power conversion device 1 in the first embodiment, control gain G* of individual voltage controller 205 is set to a greater value when variations of capacitor voltages Vc of individual converter cells 7 are great. This increases control output dkref of individual voltage controller 205, thereby enhancing the effectiveness of individual control. As a result, variations of individual capacitor voltages Vc can be suppressed.

Second Embodiment

In power conversion device 1 in a second embodiment, when variations of capacitor voltages Vc of individual converter cells 7 are great, any one of the sign of amplitude Amp, phase $\theta i$, and carrier frequency fc of carrier signal CS input to carrier generator 203 in FIG. 7 is changed. This changes the relation between the phase of a harmonic current component included in arm current Iarm and the phase of a harmonic voltage component included in output voltage of each converter cell 7. As a result, for converter cell 7 in which harmonic current has been charged in power storage element 32 so far, the increase of capacitor voltage Vc can be suppressed or changed to decrease. Conversely, for converter cell 7 in which harmonic current has been discharged from power storage element 32 so far, the decrease of capacitor voltage Vc can be suppressed or changed to increase.

The detail will be described below with reference to FIG. 12 to FIG. 17. In the second embodiment, it is assumed that control gain G* used in individual voltage controller 205 is fixed to 1. Alternatively, it may be assumed that gain multiplier 212 FIG. 9 is not provided. However, the first embodiment and the second embodiment may be combined.

Figure 12:
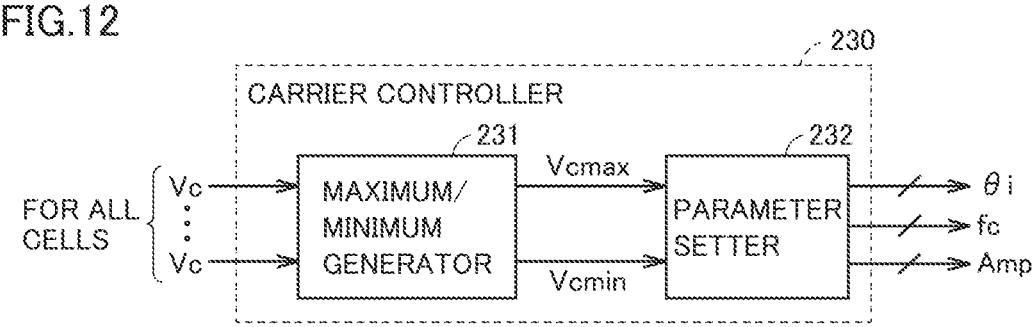
FIG. 12 is a block diagram showing a configuration example of a carrier controller provided in the control device.

FIG. 12 is a block diagram showing a configuration example of a carrier controller provided in the control device. Carrier controller 230 sets phase $\theta i$, carrier frequency fc, and amplitude Amp of carrier signal CS and inputs these setting values to carrier generator 203 of each individual cell controller 202. As shown in FIG. 12, carrier controller 230 includes a maximum/minimum generator 231 and a parameter setter 232.

Maximum/minimum generator 231 receives capacitor voltage Vc detected by voltage detector 33 in each converter cell 7. Maximum/minimum generator 231 determines maximum value Vcmax and minimum value Vcmin of capacitor voltages Vc of all of converter cells 7. In some modifications described later, maximum/minimum generator 231 further specifies converter cell 7 with capacitor voltage Vc having maximum value Vcmax and/or minimum value Vcmin.

Parameter setter 232 receives information on maximum value Vcmax and minimum value Vcmin and information on converter cell 7 with capacitor voltage Vc having maximum value Vcmax and/or minimum value Vcmin from maximum/minimum generator 231. If the difference between maximum value Vcmax and minimum value Vcmin is greater than threshold value Vth, parameter setter 232 changes any one of phase $\theta i$, carrier frequency fc, and the sign of amplitude Amp of carrier signal CS. The specifics will be described below.

Figure 13:
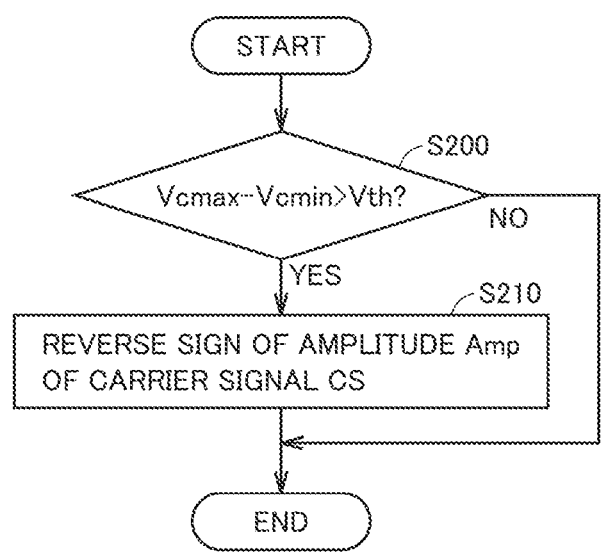
FIG. 13 is a flowchart showing a first operation example of a parameter setter in FIG. 12.

FIG. 13 is a flowchart showing a first operation example of the parameter setter in FIG. 12. Referring to FIG. 13, if the difference between maximum value Vcmax and minimum value Vcmin of capacitor voltages Vc of all of converter cells 7 is greater than threshold value Vth (YES at step S200), parameter setter 232 reverses the sign of the setting value of amplitude Amp of carrier signal CS (step S210). On the other hand, if the difference between maximum value Vcmax and minimum value Vcmin of capacitor voltages Vc is equal to or smaller than threshold value Vth (NO at step S200), the sign of the setting value of amplitude Amp of carrier signal CS is not changed.

As described above, the sign of amplitude Amp of carrier signal CS is reversed, whereby the phase of the carrier frequency component of output voltage of each converter cell 7 is shifted 180 degrees. Thus, for converter cell 7 in which capacitor voltage Vc increases because harmonic current has been charged in power storage element 32 so far, harmonic current is discharged from power storage element 32 in the opposite way and capacitor voltage Vc decreases. On the other hand, for converter cell 7 in which capacitor voltage Vc decreases because harmonic current has been discharged from power storage element 32 so far, harmonic current is charged into power storage element 32 in the opposite way and capacitor voltage Vc increases. Consequently, variations of individual capacitor voltages Vc can be suppressed.

Figure 14:
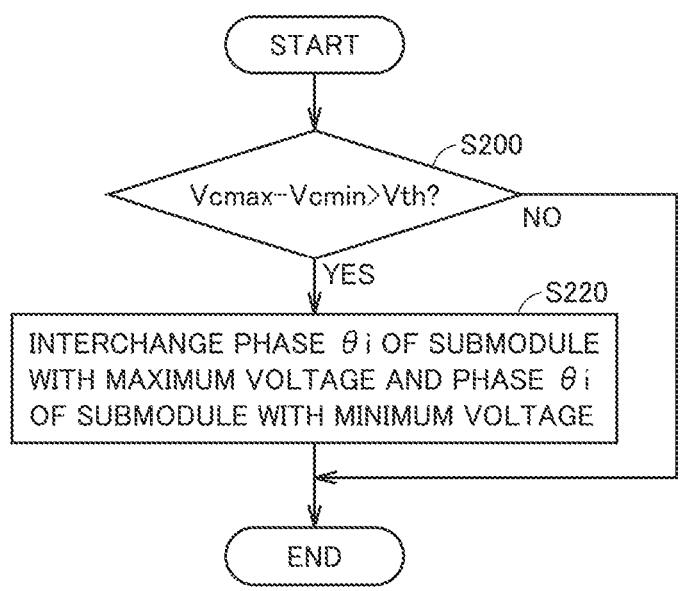
FIG. 14 is a flowchart showing a second operation example of the parameter setter in FIG. 12.

FIG. 14 is a flowchart showing a second operation example of the parameter setter in FIG. 12. Referring to FIG. 14, if the difference between maximum value Vcmax and minimum value Vcmin of capacitor voltages Vc of all of converter cells 7 is greater than threshold value Vth (YES at step S200), parameter setter 232 interchanges the phase $\theta i$ of carrier signal CS for generating gate signal ga to be supplied to converter cell 7 with capacitor voltage Vc having maximum value Vcmax and the phase $\theta i$ of carrier signal CS for generating gate signal ga to be supplied to converter cell 7 with capacitor voltage Vc having minimum value Vcmin (step S220). On the other hand, if the difference between maximum value Vcmax and minimum value Vcmin of capacitor voltages Vc is equal to or smaller than threshold value Vth (NO at step S200), the phases $\theta i$ of carrier signals CS are not interchanged.

As described above, the phases $\theta i$ of carrier signals CS are interchanged, whereby capacitor voltage Vc of converter cell 7 having maximum value Vcmax changes from increase to decrease, and capacitor voltage Vc of converter cell 7 having minimum value Vcmin changes from decrease to increase. As a result, variations of capacitor voltages Vc can be suppressed.

Figure 15:
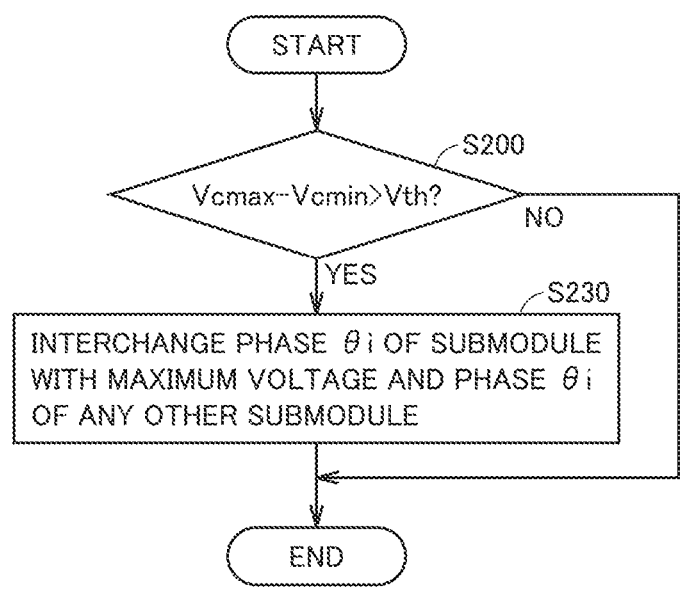
FIG. 15 is a flowchart showing a third operation example of the parameter setter in FIG. 12.

FIG. 15 is a flowchart showing a third operation example of the parameter setter in FIG. 12. Referring to FIG. 15, if the difference between maximum value Vcmax and minimum value Vcmin of capacitor voltages Vc of all of converter cells 7 is greater than threshold value Vth (YES at step S200), parameter setter 232 interchanges the phase $\theta i$ of carrier signal CS for generating gate signal ga to be supplied to converter cell 7 with capacitor voltage Vc having maximum value Vcmax with the phase $\theta i$ of carrier signal CS for generating gate signal ga to be supplied to any other converter cell 7 (step S230). On the other hand, if the difference between maximum value Vcmax and minimum value Vcmin of capacitor voltages Vc is equal to or smaller than threshold value Vth (NO at step S200), the phases $\theta i$ of carrier signals CS are not interchanged.

As described above, the phases $\theta i$ of carrier signals CS are interchanged, whereby increase of capacitor voltage Vc of converter cell 7 having maximum value Vcmax can be suppressed or changed to decrease. As a result, variations of capacitor voltages Vc can be suppressed.

Figure 16:
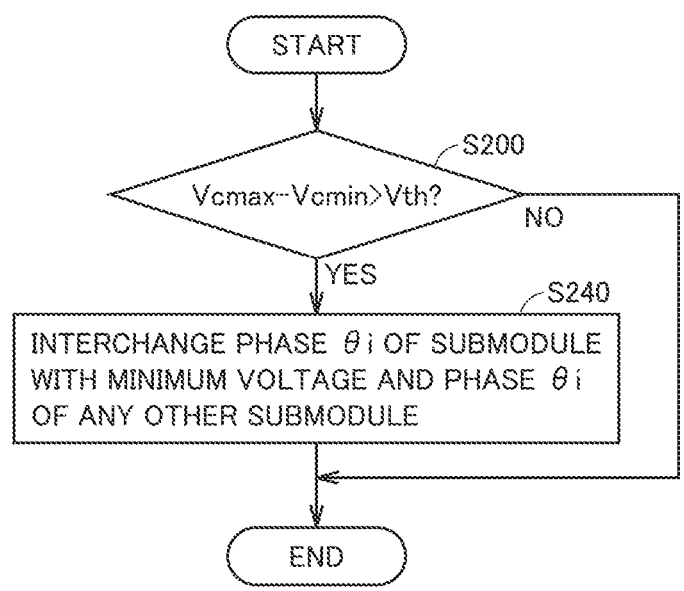
FIG. 16 is a flowchart showing a fourth operation example of the parameter setter in FIG. 12.

FIG. 16 is a flowchart showing a fourth operation example of the parameter setter in FIG. 12. Referring to FIG. 16, if the difference between maximum value Vcmax and minimum value Vcmin of capacitor voltages Vc of all of converter cells 7 is greater than threshold value Vth (YES at step S200), parameter setter 232 interchanges the phase $\theta i$ of carrier signal CS for generating gate signal ga to be supplied to converter cell 7 with capacitor voltage Vc having minimum value Vcmin with the phase θi of carrier signal CS for generating gate signal ga to be supplied to any other converter cell 7 (step S240). On the other hand, if the difference between maximum value Vcmax and minimum value Vcmin of capacitor voltages Vc is equal to or smaller than threshold value Vth (NO at step S200), the phases θi of carrier signals CS are not interchanged.

As described above, the phases θi of carrier signals CS are interchanged, whereby decrease of capacitor voltage Vc of converter cell 7 having minimum value Vcmin can be suppressed or changed to increase. As a result, variations of individual capacitor voltages Vc can be suppressed.

Figure 17:
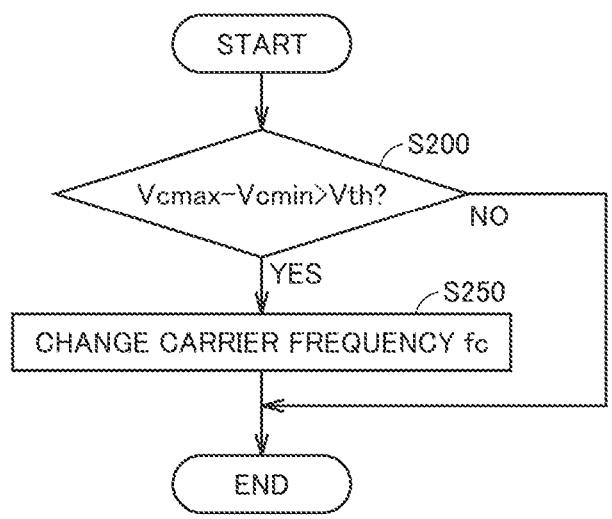
FIG. 17 is a flowchart showing a fifth operation example of the parameter setter in FIG. 12.

FIG. 17 is a flowchart showing a fifth operation example of the parameter setter in FIG. 12. Referring to FIG. 17, if the difference between maximum value Vcmax and minimum value Vcmin of capacitor voltages Vc of all of converter cells 7 is greater than threshold value Vth (YES at step S200), parameter setter 232 changes the carrier frequency fc (step S250). On the other hand, if the difference between maximum value Vcmax and minimum value Vcmin of capacitor voltages Vc is equal to or smaller than threshold value Vth (NO at step S200), the carrier frequency fc is not changed.

As described above, changing the carrier frequency fc changes the relation between the phase of a harmonic current component included in arm current Iarm and the phase of a harmonic voltage component included in output voltage of each converter cell 7. As a result, for converter cell 7 in which harmonic current has been charged in power storage element 32 so far, the increase of capacitor voltage Vc can be suppressed or changed to decrease. Conversely, for converter cell 7 in which harmonic current has been discharged from power storage element 32 so far, the decrease of capacitor voltage Vc can be suppressed or changed to increase.

Although the effect described above is achieved by either increasing or decreasing the carrier frequency fc from the value at present, it is desirable to increase the carrier frequency fc, because if so, the harmonic current component is shifted toward the higher order and thus the amplitude is reduced.

As described above, in power conversion device 1 in the second embodiment, when variations of capacitor voltages Vc of individual converter cells 7 are great, any one of the sign of amplitude Amp of carrier signal CS, the carrier frequency fc, and the phase θi of carrier signal CS to be supplied to converter cell 7 having capacitor voltage Vc with a relatively large difference from the mean value is changed. Thus, for converter cell 7 with capacitor voltage Vc increasing so far, the increase of capacitor voltage Vc can be suppressed or changed to decrease. On the other hand, for converter cell 7 with capacitor voltage Vc decreasing so far, the decrease of capacitor voltage Vc can be suppressed or changed to increase. As a result, variations of individual capacitor voltages Vc can be suppressed.

At step S200 in FIG. 13 to FIG. 17, instead of the difference between maximum value Vcmax and minimum value Vcmin of capacitor voltages Vc, an evaluation value that represents the degree of variations of individual capacitor voltages Vc, such as the variance or the standard deviation of capacitor voltages Vc of all of converter cells 7, may be used.

Third Embodiment

In power conversion device 1 in a third embodiment, bypass switch 34 provided in converter cell 7 with the maximum capacitor voltage Vc is controlled to the ON state. On the other hand, gate signal ga supplied to converter cell 7 with the minimum capacitor voltage Vc is blocked, so that all of switching elements 31 provided in this converter cell 7 are controlled to the open state. The specifics will be described below with reference to the drawings. The third embodiment may be combined with the first embodiment or may be combined with the operation examples in FIG. 13 and FIG. 17 in the second embodiment.

Figure 18:
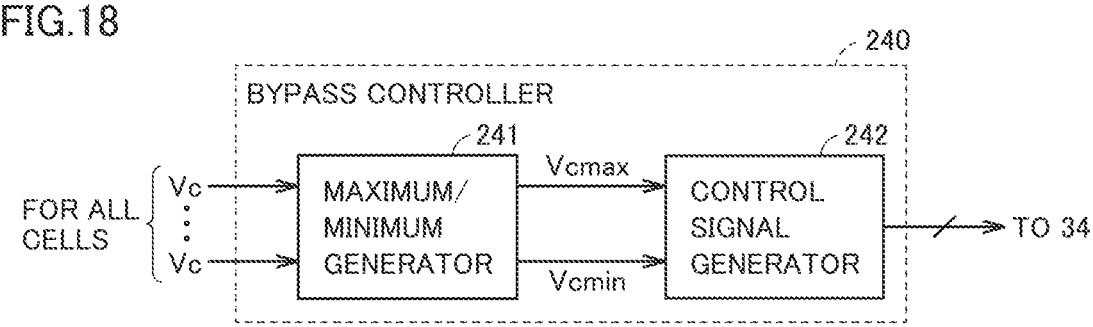
FIG. 18 is a block diagram showing a configuration example of a bypass controller provided in the control device.

FIG. 18 is a block diagram showing a configuration example of a bypass controller provided in the control device. Bypass controller 240 outputs a control signal for controlling opening/closing of bypass switch 34 to each converter cell 7. As shown in FIG. 18, bypass controller 240 includes a maximum/minimum generator 241 and a control signal generator 242.

Maximum/minimum generator 241 receives capacitor voltage Vc detected by voltage detector 33 in each converter cell 7. Maximum/minimum generator 241 determines maximum value Vcmax and minimum value Vcmin of capacitor voltages Vc of all of converter cells 7. Maximum/minimum generator 241 further specifies converter cell 7 with capacitor voltage Vc having maximum value Vcmax.

Control signal generator 242 receives information on maximum value Vcmax and minimum value Vcmin and information on converter cell 7 with capacitor voltage Vc having maximum value Vcmax from maximum/minimum generator 241.

Figure 19A:
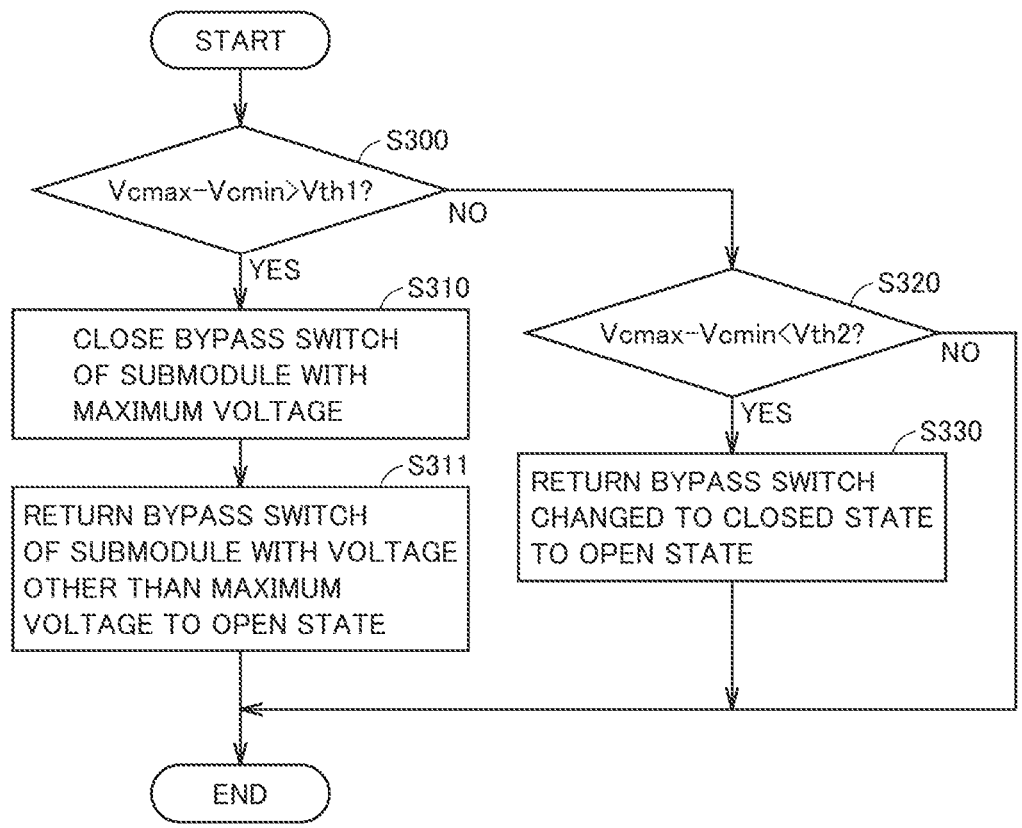
FIG. 19A is a flowchart showing an operation example of a control signal generator in FIG. 18.

FIG. 19A is a flowchart showing an operation example of the control signal generator in FIG. 18. Referring to FIG. 19A, if the difference between maximum value Vcmax and minimum value Vcmin of capacitor voltages Vc of all of converter cells 7 is greater than a threshold Vth1 (YES at step S300), control signal generator 242 outputs a control signal for closing bypass switch 34 to converter cell 7 with the maximum capacitor voltage Vc (step S310). Closing bypass switch 34 allows arm current Iarm to pass through the closed bypass switch 34. Thus, the voltage accumulated in power storage element 32 (that is, capacitor voltage Vc) of the converter cell 7 naturally decreases due to leakage.

Subsequently, if there is any bypass switch 34 in the closed state in converter cell 7 with capacitor voltage Vc other than the maximum voltage, control signal generator 242 outputs a control signal for returning that bypass switch 34 to the open state (step S311).

On the other hand, if the difference between maximum value Vcmax and minimum value Vcmin of capacitor voltages Vc of all of converter cells 7 is smaller than a threshold value Vth2 (where Vth2<Vth1) (NO at step S300, YES at step 320), control signal generator 242 outputs a control signal for returning bypass switch 34 changed to the closed state at step S310, to the open state, to the converter cell 7 (step 330). Otherwise (NO at step S300, NO at step S320), control signal generator 242 does not change the state of bypass switch 34.

Figure 19B:
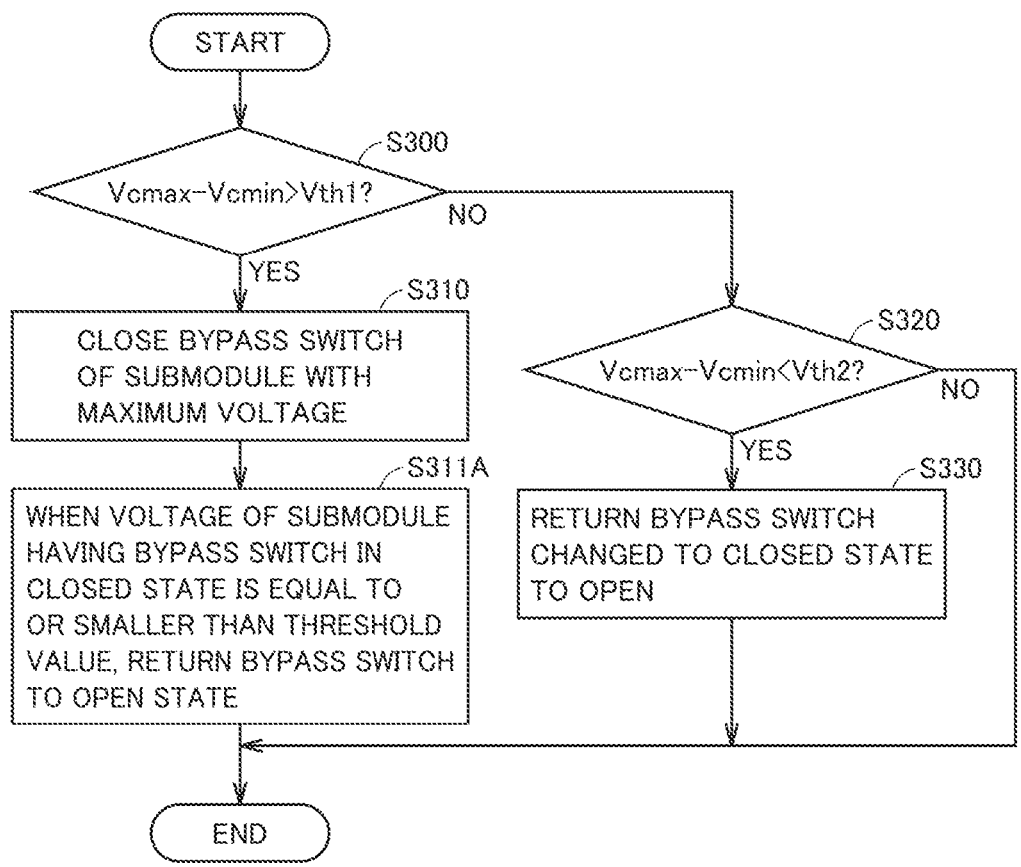
FIG. 19B is a flowchart showing a modification of FIG. 19A.

FIG. 19B is a flowchart showing a modification of FIG. 19A. In the flowchart in FIG. 19B, step S311A is provided instead of step S311 in FIG. 19A. At step S311A, if capacitor voltage Vc of converter cell 7 having bypass switch 34 in the closed state is equal to or smaller than a threshold value, control signal generator 242 outputs a control signal for returning the bypass switch 34 to the open state. Thus, in converter cell 7 in which bypass switch 34 is closed at step S310, the closed state of bypass switch 34 is continued until capacitor voltage Vc decreases to the threshold value. In the other respects, FIG. 19B is similar to FIG. 19A and the same or corresponding steps are denoted by the same reference signs and will not be further elaborated.

Figure 20:
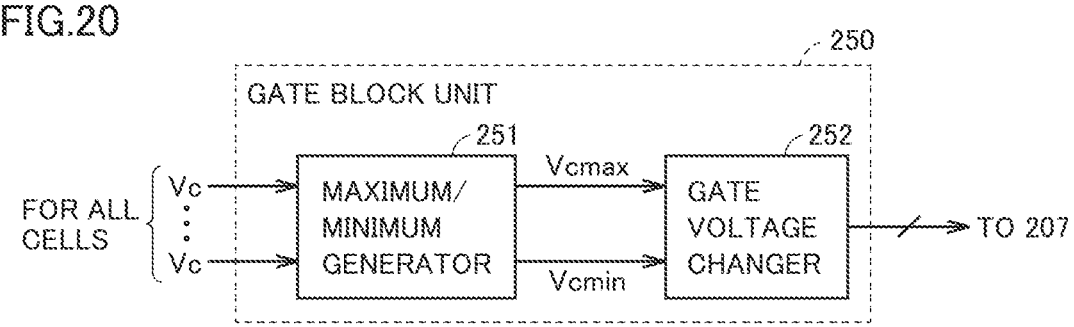
FIG. 20 is a block diagram showing a configuration example of a gate block unit provided in the control device.

FIG. 20 is a block diagram showing a configuration example of a gate block unit provided in the control device. Gate block unit 250 outputs a control signal for blocking gate signal ga to be transmitted to each converter cell 7 to gate signal generator 207 of each individual cell controller 202. When gate signal ga is blocked, gate signal generator 207 controls all of switching elements 31 in the corresponding converter cell 7 to the open state. As shown in FIG. 20, gate block unit 250 includes a maximum/minimum generator 251 and a gate voltage changer 252.

Maximum/minimum generator 251 receives capacitor voltage Vc detected by voltage detector 33 in each converter cell 7. Maximum/minimum generator 251 determines maximum value Vcmax and minimum value Vcmin of capacitor voltages Vc of all of converter cells 7. Maximum/minimum generator 251 further specifies converter cell 7 with capacitor voltage Vc having minimum value Vcmin.

Gate voltage changer 252 receives information on maximum value Vcmax and minimum value Vcmin and information on converter cell 7 with capacitor voltage Vc having minimum value Vcmin from maximum/minimum generator 251.

Figure 21A:
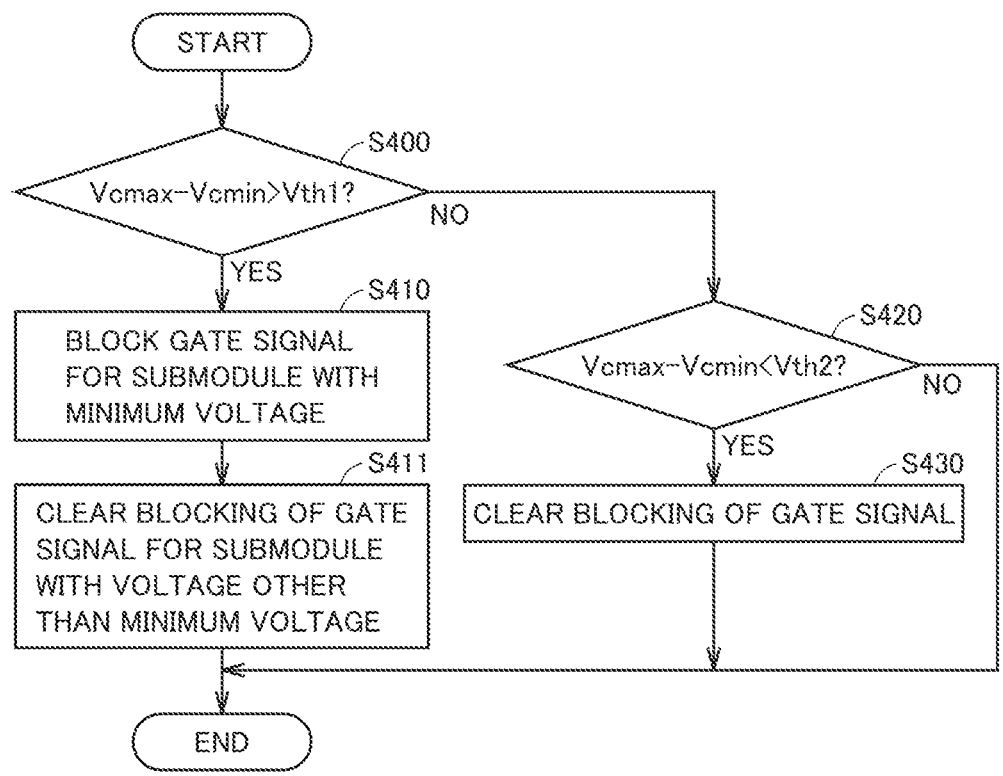
FIG. 21A is a flowchart showing an operation example of a gate voltage changer in FIG. 20.

FIG. 21A is a flowchart showing an operation example of the gate voltage changer in FIG. 20. Referring to FIG. 21A, if the difference between maximum value Vcmax and minimum value Vcmin of capacitor voltages Vc of all of converter cells 7 is greater than threshold Vth1 (YES at step S400), gate voltage changer 252 blocks gate signal ga output from gate signal generator 207 corresponding to converter cell 7 with the minimum capacitor voltage Vc (step S410). Thus, gate signal generator 207 controls all of switching elements 31 in the corresponding converter cell 7 to the open state. When all of switching elements 31 are controlled to the open state, arm current Iarm flows into power storage element 32 through the freewheeling diodes, thereby increasing capacitor voltage Vc.

Subsequently, if gate signal ga is blocked in any converter cell 7 having capacitor voltage Vc other than the minimum voltage, gate voltage changer 252 clears the blocking of gate signal ga for that converter cell 7 (step S411).

On the other hand, if the difference between maximum value Vcmax and minimum value Vcmin of capacitor voltages Vc of all of converter cells 7 is smaller than threshold value Vth2 (where Vth2<Vth1) (NO at step S400, YES at step 420), gate voltage changer 252 clears the blocked state of gate signal ga set at step S410 (step S430). That is, the operation of converter cell 7 in which all of switching elements 31 are set to the open state returns to the normal switching operation. Otherwise (NO at step S400, NO at step S420), gate voltage changer 252 maintains the control state at present.

Figure 21B:
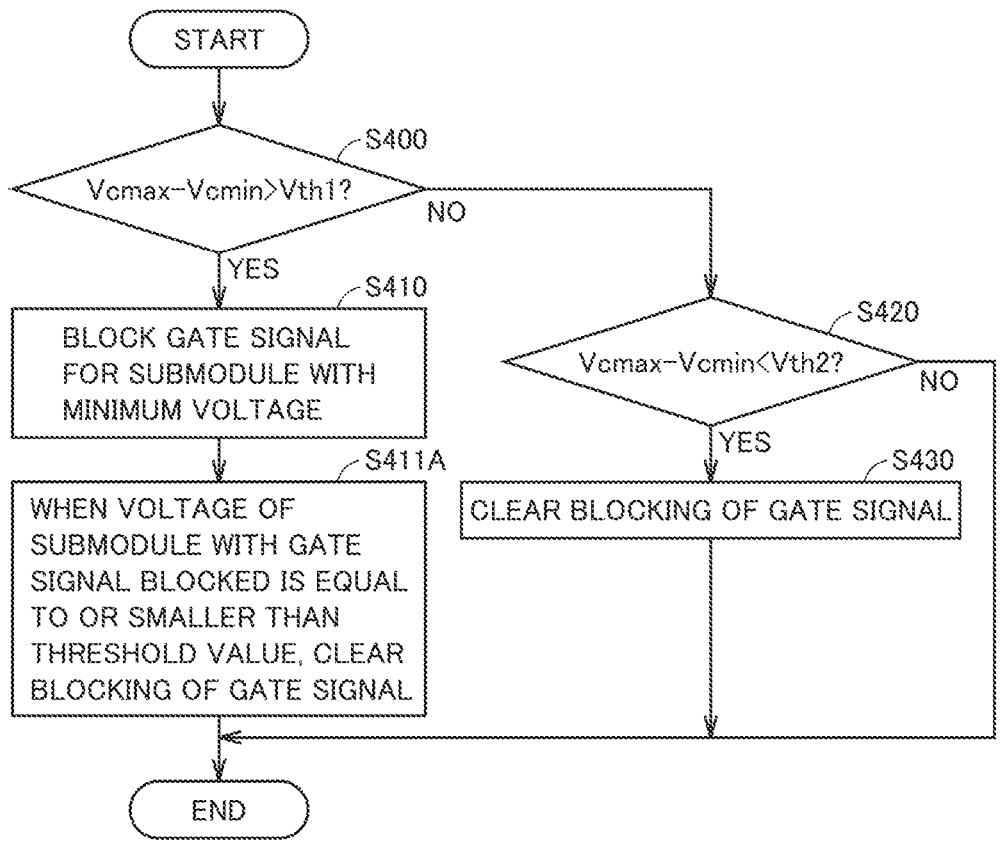
FIG. 21B is a flowchart showing a modification of FIG. 21A.

FIG. 21B is a flowchart showing a modification of FIG. 21A. In the flowchart in FIG. 21B, step S411A is provided instead of step S411 in FIG. 21A. At step S411A, if capacitor voltage Vc of converter cell 7 with gate signal ga blocked is equal to or greater than a threshold value, gate voltage changer 252 clears blocking of gate signal ga for that converter cell 7. Thus, in converter cell 7 with gate signal ga blocked at step S410, blocking of gate signal ga is continued until capacitor voltage Vc rises to the threshold value. In the other respects, FIG. 21B is similar to FIG. 21A and the same or corresponding steps are denoted by the same reference signs and will not be further elaborated.

As described above, in power conversion device 1 in the third embodiment, bypass switch 34 provided in converter cell 7 with the maximum capacitor voltage Vc is controlled to the ON state, whereby capacitor voltage Vc of the converter cell 7 decreases. On the other hand, gate signal ga supplied to converter cell 7 with the minimum capacitor voltage Vc is blocked, whereby all of switching elements 31 provided in the converter cell 7 are controlled to the open state. Thus, capacitor voltage Vc of the converter cell 7 is increased. As a result, variations of individual capacitor voltages Vc can be suppressed.

At step S300 in FIG. 19A and step S400 in FIG. 21A, instead of the difference between maximum value Vcmax and minimum value Vcmin of capacitor voltages Vc, an evaluation value that represents the degree of variations of individual capacitor voltages Vc, such as the variance or the standard deviation of capacitor voltages Vc of all of converter cells 7, may be used.

In the case of half-bridge converter cell 7 in FIG. 2(a), similar effects can be achieved by controlling semiconductor switching element 31n to the ON state, rather than by controlling bypass switch 34 to the ON state. In the case of full-bridge converter cell 7 in FIG. 2(b), similar effects can be achieved by controlling semiconductor switching elements 31p1, 31p2 to the ON state or controlling semiconductor switching elements 31n1, 31n2 to the ON state, rather than by controlling bypass switch 34 to the ON state.

In other words, converter cell 7 with the maximum capacitor voltage Vc is controlled to the bypass state in which current does not flow into power storage element 32 or flow out of power storage element 32. The bypass state may be made by turning ON bypass switch 34 as described above or by turning ON any of semiconductor switching elements 31.

Fourth Embodiment

In a fourth embodiment, a more generalized form of the foregoing first to third embodiments will be described.

Figure 22:
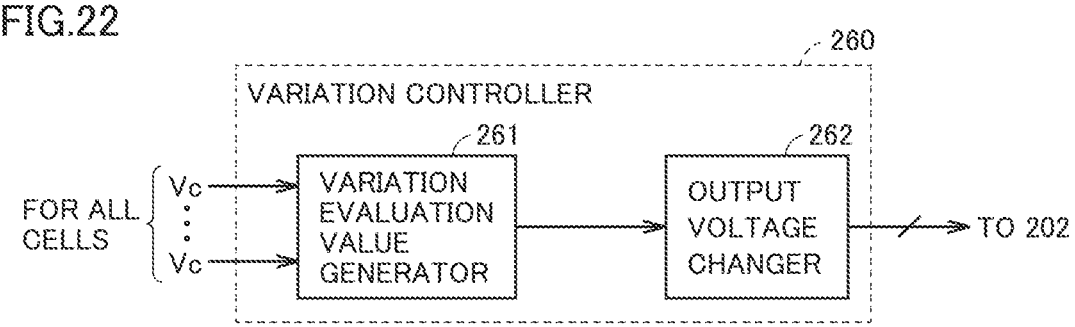
FIG. 22 is a block diagram showing a configuration example of a variation controller that is a generalized form of the gain controller in FIG. 10, the carrier controller in FIG. 12, the bypass controller in FIG. 18, and the gate block unit in FIG. 20.

FIG. 22 is a block diagram showing a configuration example of a variation controller that is a generalized form of the gain controller in FIG. 10, the carrier controller in FIG. 12, the bypass controller in FIG. 18, and the gate block unit in FIG. 20. A variation controller 260 is provided in control device 3 to control variations of individual capacitor voltages. As shown in FIG. 22, variation controller 260 includes a variation evaluation value generator 261 and an output voltage changer 262.

Variation evaluation value generator 261 corresponds to maximum/minimum generators 221, 231, 241, 251 in FIG. 10, FIG. 12, FIG. 18, and FIG. 20. Variation evaluation value generator 261 receives capacitor voltage Vc detected by voltage detector 33 in each converter cell 7 and generates an evaluation value representing the degree of variations of individual capacitor voltages Vc. The evaluation value is, for example, the difference between maximum value Vcmax and minimum value Vcmin, the variance, or the standard deviation.

Output voltage changer 262 corresponds to gain setter 222 in FIG. 10, parameter setter 232 in FIG. 12, control signal generator 242 in FIG. 18, and gate voltage changer 252 in FIG. 20. When the evaluation value generated by variation evaluation value generator 261 exceeds a threshold value, output voltage changer 262 controls individual cell controller 202 such that the output voltage of individual converter cell 7 is changed so that variations of capacitor voltages Vc are suppressed.

Figure 23:
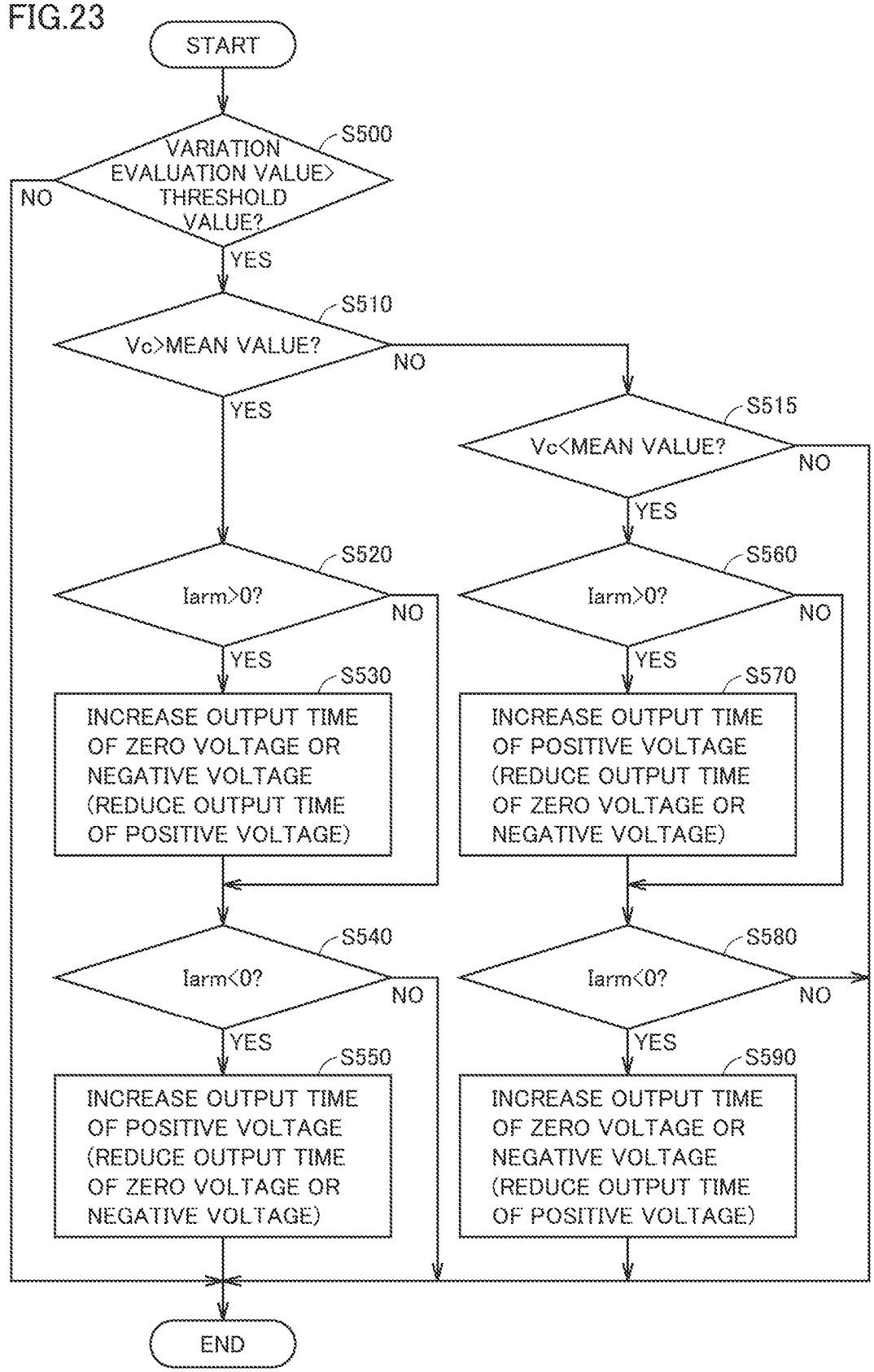
FIG. 23 is a flowchart for explaining the operation of an output voltage changer in FIG. 22.

FIG. 23 is a flowchart for explaining the operation of the output voltage changer in FIG. 22. Referring to FIG. 23, if the evaluation value representing the degree of variations exceeds a threshold value (YES at step S500), output voltage changer 262 performs the subsequent step.

Specifically, for at least one converter cell 7 with capacitor voltage Vc greater than the mean value (YES at step S510), output voltage changer 262 performs at least one of the following (i) or (ii).

(i) When arm current Iarm flowing through the converter cell 7 is positive, that is, arm current Iarm flows in the positive direction that is the direction from high potential-side input/output terminal P1 to low potential-side input/output terminal P2 (YES at step S520), output voltage changer 262 controls individual cell controller 202 corresponding to the converter cell 7 such that the output time of zero voltage or negative voltage is increased (that is, the output time of positive voltage is reduced) (step S530). Thus, capacitor voltage Vc of the converter cell 7 decreases.

(ii) When arm current Iarm flowing through the converter cell 7 is in the negative direction (YES at step S540), output voltage changer 262 controls individual cell controller 202 corresponding to the converter cell 7 such that the output time of positive voltage is increased (that is, the output time of zero voltage or negative voltage is reduced) (step S550). Thus, capacitor voltage Vc of the converter cell 7 decreases.

On the other hand, for at least one converter cell 7 with capacitor voltage Vc smaller than the mean value (YES at step S515), output voltage changer 262 performs at least one of the following (iii) or (iv).

(iii) When arm current Iarm flowing through the converter cell 7 is in the positive direction (YES at step S560), output voltage changer 262 controls individual cell controller 202 corresponding to the converter cell 7 such that the output time of positive voltage is increased (that is, the output time of zero voltage or negative voltage is reduced) (step S570). Thus, capacitor voltage Vc of the converter cell 7 increases.

(iv) When arm current Iarm flowing through the converter cell 7 is in the negative direction (YES at step S580), output voltage changer 262 controls individual cell controller 202 corresponding to the converter cell 7 such that the output time of zero voltage or negative voltage is increased (that is, the output time of positive voltage is reduced) (step S590). Thus, capacitor voltage Vc of the converter cell 7 increases.

In the case of gain setter 222 in FIG. 10 described above, all of the above (i) to (iv) are implemented by setting control gain G* in individual voltage controller 205 to a value greater than 1.

In the case of parameter setter 232 in FIG. 12, all of the above (i) to (iv) are implemented by reversing the sign of amplitude Amp of carrier signal CS (step S210 in FIG. 13).

All of the above (i) to (iv) are implemented by interchanging the phase θi of carrier signal CS for generating gate signal ga to be supplied to converter cell 7 with capacitor voltage Vc having maximum value Vcmax and the phase θi of carrier signal CS for generating gate signal ga to be supplied to converter cell 7 with capacitor voltage Vc having minimum value Vcmin (step S220 in FIG. 14).

The above (i) and (ii) are implemented by interchanging the phase θi of carrier signal CS for generating gate signal ga to be supplied to converter cell 7 with capacitor voltage Vc having maximum value Vcmax with the phase θi of carrier signal CS for generating gate signal ga to be supplied to any other converter cell 7 (step S230 in FIG. 15).

The above (iii) and (iv) are implemented by interchanging the phase θi of carrier signal CS for generating gate signal ga to be supplied to converter cell 7 with capacitor voltage Vc having minimum value Vcmin with the phase θi of carrier signal CS for generating gate signal ga to be supplied to any other converter cell 7 (step S240 in FIG. 16).

All of the above (i) to (iv) are implemented by changing the carrier frequency fc (step S250 in FIG. 17).

In the case of control signal generator 242 in FIG. 18, the above (i) is implemented by closing bypass switch 34 of converter cell 7 with the maximum capacitor voltage Vc (step S310 in FIG. 19A).

In the case of gate voltage changer 252 in FIG. 20, the above (iii) and (iv) are implemented by blocking gate signal ga output to converter cell 7 with the minimum capacitor voltage Vc (step S410 in FIG. 21A).

Embodiments disclosed here should be understood as being illustrative rather than being limitative in all respects. The scope of the subject application is shown not in the foregoing description but in the claims, and it is intended that all modifications that come within the meaning and range of equivalence to the claims are embraced here.

REFERENCE SIGNS LIST 1 power conversion device, 2 power converter, 3 control device, 4 leg circuit, 5 upper arm, 6 lower arm, 7 converter cell, 12 AC circuit, 14 DC circuit, 31 switching element, 32 power storage element (capacitor), 33 voltage detector, 34 bypass switch, 202 individual cell controller, 203 carrier generator, 205 individual voltage controller, 207 gate signal generator, 211 PI controller, 212 gain multiplier, 220 gain controller, 221, 231, 241, 251 maximum/minimum generator, 222 gain setter, 230 carrier controller, 232 parameter setter, 240 bypass controller, 242 control signal generator, 250 gate block unit, 252 gate voltage changer, 260 variation controller, 261 variation evaluation value generator, 262 output voltage changer, 501 switching control unit, 502 basic controller, 503 arm controller, 601 arm voltage command generator, 603 AC current controller, 604 circulating current calculator, 605 circulating current controller, 606 command distributor, 610 voltage macro controller, 612 all voltage controller, 614 inter-group voltage controller, 700 voltage evaluation value generator, Amp amplitude, CS carrier signal, G* control gain, Nn low potential-side DC terminal, Np high potential-side DC terminal, Nu, Nv, Nw AC input terminal, P1, P2 input/output terminal, Vc capacitor voltage, Vth, Vth1, Vth2 threshold value, dkref control output, fc carrier frequency, ga gate signal, kref arm voltage command value, krefc cell voltage command value.

The invention claimed is:

1. A power conversion device comprising:
a power converter including at least one arm having a plurality of converter cells connected to each other in cascade,
each of the converter cells including:
a first input/output terminal on a high potential side;
a second input/output terminal on a low potential side;
a plurality of switching elements;
a power storage element having a positive electrode terminal and a negative electrode terminal, holding a positive voltage between the positive and negative electrode terminals, and electrically connected to the first input/output terminal and the second input/output terminal through the switching elements; and
a voltage detector to detect a voltage of the power storage element; and
a control device to perform phase shift pulse width control for the converter cells included in the at least one arm, wherein the control device calculates an evaluation value representing a degree of variations in positive voltage of the power storage elements in the converter cells included in the at least one arm, and when the evaluation value exceeds a threshold value, performs phase shift pulse width control for at least one of the converter cells such that at least one of the following is implemented:
(i) when current in a first direction that is a direction from the first input/output terminal to the second input/output terminal flows through at least one first converter cell with a positive voltage of the power storage element greater than a mean value, reducing a time for a positive voltage output caused by a first switching state of the switching elements in which the positive electrode terminal of the power storage element is connected to the first input/output terminal and the negative electrode terminal of the power storage element is connected to the second input/output terminal;
(ii) when current in a second direction opposite to the first direction flows through the first converter cell, increasing a time for the positive voltage output caused by the first switching state;
(iii) when current in the first direction flows through at least one second converter cell with a positive voltage of the power storage element smaller than a mean value, increasing a time for the positive voltage output caused by the first switching state; or
(iv) when current in the second direction flows through the second converter cell, reducing a time for the positive voltage output caused by the first switching state.

2. The power conversion device according to claim 1, wherein
the control device generates a final voltage command value for each converter cell by adding, to a voltage command value common to the converter cells, an individual voltage command value for each converter cell in accordance with a deviation between a positive voltage of the power storage element and a command value thereof, and
when the evaluation value exceeds the threshold value, the control device sets a gain in generating the individual voltage command value to a larger value than when the evaluation value is equal to or smaller than the threshold value.

3. The power conversion device according to claim 1, wherein when the evaluation value exceeds the threshold value, the control device changes a sign, a phase, or a frequency of a carrier signal in generating a pulse width modulation signal to be output to each of the converter cells.

4. The power conversion device according to claim 1, wherein when the evaluation value exceeds the threshold value, the control device reverses a sign of a carrier signal in generating a pulse width modulation signal to be output to each of the converter cells.

5. The power conversion device according to claim 1, wherein when the evaluation value exceeds the threshold value, the control device interchanges a phase of a carrier signal in generating a pulse width modulation signal to be output to a converter cell with a maximum positive voltage of the power storage element and a phase of a carrier signal in generating a pulse width modulation signal to be output to a converter cell with a minimum positive voltage of the power storage element.

6. The power conversion device according to claim 1, wherein when the evaluation value exceeds the threshold value, the control device interchanges a phase of a carrier signal in generating a pulse width modulation signal to be output to a converter cell with a maximum positive voltage of the power storage element and a phase of a carrier signal in generating a pulse width modulation signal to be output to any other converter cell.

7. The power conversion device according to claim 1, wherein when the evaluation value exceeds the threshold value, the control device interchanges a phase of a carrier signal in generating a pulse width modulation signal to be output to a converter cell with a minimum positive voltage of the power storage element and a phase of a carrier signal in generating a pulse width modulation signal to be output to any other converter cell.

8. The power conversion device according to claim 1, wherein when the evaluation value exceeds the threshold value, the control device changes a frequency of a pulse width modulation signal to be output to each of the converter cells.

9. A power conversion device comprising:
a power converter including at least one arm having a plurality of converter cells connected to each other in cascade,
each of the plurality of converter cells including:
a first input/output terminal on a high potential side;
a second input/output terminal on a low potential side;
a plurality of switching elements;
a power storage element having a positive electrode terminal and a negative electrode terminal, holding a positive voltage between the positive and negative electrode terminals, and electrically connected to the first input/output terminal and the second input/output terminal through the switching elements; and
a voltage detector to detect a voltage of the power storage element; and
a control device to perform phase shift pulse width control for the converter cells included in the at least one arm, wherein
the control device calculates an evaluation value representing a degree of variations in voltage of the power storage elements in the converter cells included in the at least one arm,
when the evaluation value exceeds the threshold value, the control device controls a converter cell with a maximum positive voltage of the power storage element to a bypass state in which current does not flow into the power storage element or flow out of the power storage element,
when the evaluation value has been changed to a value that does not exceed the threshold value, the control device controls the converter cell changed to the bypass state to be returned back from the bypass state, and
when the evaluation value remains to exceed the threshold value and the converter cell changed to the bypass state does not have a maximum positive voltage of the power storage element, the control device controls the converter cell changed to the bypass state to be returned back from the bypass state, and instead controls another converter cell with a maximum positive voltage of the power storage element to the bypass state.

10. The power conversion device according to claim 9, wherein each of the converter cells further includes a bypass switch having one end connected to the first input/output terminal and the other end connected to the second input/output terminal, and the bypass state includes a closed state of the bypass switch.

11. A power conversion device comprising:
- a power converter including at least one arm having a plurality of converter cells connected to each other in cascade,
- each of the plurality of converter cells including:
  - a first input/output terminal on a high potential side;
  - a second input/output terminal on a low potential side;
  - a plurality of switching elements;
  - a power storage element having a positive electrode terminal and a negative electrode terminal, holding a positive voltage between the positive and negative electrode terminals, and electrically connected to the first input/output terminal and the second input/output terminal through the switching elements; and
  - a voltage detector to detect a voltage of the power storage element; and
- a control device to perform phase shift pulse width control for the converter cells included in the at least one arm, wherein
  - the control device calculates an evaluation value representing a degree of variations in voltage of the power storage elements in the converter cells included in the at least one arm,
  - when the evaluation value exceeds the threshold value, the control device controls each of the switching elements included in a converter cell with a minimum positive voltage of the power storage element, to an open state,
  - when the evaluation value has been changed to a value that does not exceed the threshold value, the control device again performs phase shift pulse width control for the converter cell with the switching elements each being set to the open state, and
  - when the evaluation value remains to exceed the threshold value and the converter cell with the switching elements each being set to the open state does not have a minimum positive voltage of the power storage element, the control device again performs phase shift pulse width control for the converter cell with the switching elements each being set to the open state, and instead controls each of the switching elements included in another converter cell with a minimum positive voltage of the power storage element, to an open state.

* * * * *